United States Patent [19]

Taylor, Jr. et al.

[11] Patent Number: 5,568,150

[45] Date of Patent: Oct. 22, 1996

[54] METHOD AND APPARATUS FOR HYBRID ANALOG-DIGITAL PULSE COMPRESSION

[75] Inventors: John W. Taylor, Jr.; Herman J. Blinchikoff, both of Baltimore; Micheal J. Martineau, Ellicott City; Scott A. Hyer, Columbia, all of Md.

[73] Assignee: Northrop Grumman Corporation, Los Angeles, Calif.

[21] Appl. No.: 509,625

[22] Filed: Jul. 31, 1995

[51] Int. Cl.$^6$ ................................................. G01S 7/292
[52] U.S. Cl. ......................... 342/189; 342/196; 342/21; 342/135; 342/203
[58] Field of Search ................................... 342/189, 202, 342/203, 204, 194, 195, 196, 21, 135

[56] References Cited

U.S. PATENT DOCUMENTS

| | | | |
|---|---|---|---|
| 3,950,635 | 4/1976 | Constant | 342/70 |
| 4,293,856 | 10/1981 | Chressanthis et al. | 342/93 |
| 4,359,735 | 11/1982 | Lewis et al. | 342/194 |
| 4,404,562 | 9/1983 | Kretschmer Jr. et al. | 342/194 |
| 4,679,210 | 7/1987 | Rathi | 375/96 |
| 4,813,006 | 3/1989 | Burns et al. | 364/604 |
| 4,833,479 | 5/1989 | Carlson | 342/194 |
| 4,875,050 | 10/1989 | Rathi | 342/195 |
| 4,989,009 | 1/1991 | Zerkowitz | 342/145 |
| 5,189,428 | 2/1993 | Bouvet et al. | 342/132 |
| 5,293,168 | 3/1994 | Faulkner | 342/145 |

OTHER PUBLICATIONS

N. J. Fliege, Multirate Digital Signal Processing, pp. 1–36.

Primary Examiner—John B. Sotomayor
Attorney, Agent, or Firm—Walter G. Sutcliff

[57] ABSTRACT

A method and apparatus for hybrid analog-digital pulse compression, as well as, a method of use and manufacture includes an analog intermediate frequency filter, a converter, and a digital correlator. The analog intermediate frequency filter filters and weights returned echo signals, and the digital correlator compresses the filtered and weighted echo signals. The frequency or impulse response of the digital correlator is set based on the frequency or impulse response of the analog intermediate frequency filter to obtain a pulse compressor with minimal mismatch loss and improved sidelobe suppression. The invention provides for the lowest possible sampling rate of analog-to-digital convertors used with the apparatus; thus, minimizing the cost of this device and all subsequent digital processing.

33 Claims, 18 Drawing Sheets

5,568,150

METHOD AND APPARATUS FOR HYBRID ANALOG-DIGITAL PULSE COMPRESSION

BACKGROUND OF THE INVENTION

This invention relates generally to radar processing systems, and more particularly to a pulse compression system used therein.

In the art of pulse radar systems, it is well known that the ability of a radar system to perform detection depends upon the energy content of transmitted pulses. The larger the energy content, the higher the signal-to-noise ratio of the returning echoes. A large energy content may be obtained through pulses with large peak power and/or long pulse duration. Pulses with small durations or pulse widths are preferred since the shorter the pulse width the better the range resolution and range accuracy. The components comprising a radar system, however, often place limits on the peak power of a pulse and require that pulses of longer duration be transmitted in order to obtain the necessary energy content for a pulse. Pulse compression techniques and pulse compressors were developed to achieve the same resolution of a much shorter pulse with high peak power using much longer pulses with lower peak power.

The use of pulse compression techniques has become increasingly more important because pulse compression has made the use of solid state devices in radar applications feasible. While not being able to produce short pulses with large peak power, solid state devices can produce lower powered pulses of long duration.

Initially pulse compressors were implemented as analog devices. These devices, however, were inflexible with respect to pulse length. To change the pulse length required changing the device. Additionally, the components of analog pulse compressors experienced gain drift due to changes in temperature and aging. Furthermore, the manufacture of some of these devices was complicated by the fact that each device produced differed from the other due to deviations during the manufacturing process. This required additional steps to align each device.

The disadvantages above drove the production of digitally implemented pulse compressors. Digitally implemented pulse compressors eliminated many of the disadvantages of the analog pulse compressors such as inflexible pulse lengths. While initially these systems were very hardware intensive and expensive to produce, at the present time they are relatively inexpensive and easy to implement.

An important consideration in the design of digital systems is the sample rate of the signal being processed. This rate must be high enough to ensure that the signal is represented accurately without distortion due to aliasing. At the same time, the higher the rate, the greater the processing throughput required of the digital hardware, and hence the greater the cost. Thus it is desirable to minimize the sampling rate under the constraint of not introducing distortion which degrades the performance of the system.

Few digital pulse compression system designs constrain or achieve a constrained sampling rate. U.S. Pat. No. 4,404, 562 to Kretschmer describes one such system. The Kretschmer system transmits a linear FM signal such as shown in FIG. 1 which has a frequency sweep (bandwidth) of $F_2-F_1$ and performs pulse compression on the echoes by means of a digital pulse compressor 60 illustrated in FIG. 2.

In the Kretschmer device, a signal generator 10 generates an intermediate frequency signal having a frequency which varies linearly from a frequency $F_1$ to a frequency $F_2$ as time varies from an arbitrary time $t_0$ to time $t_0+T$. This linearly frequency modulated waveform is supplied to the mixer 12 via line 14 wherein it is mixed up to radio frequency (RF) by heterodyning it with an RF signal supplied by an RF signal generator 16 via line 18. The resultant RF signal is amplified by a power amplifier 20, passed through a standard duplexer 22, and radiated from a radar antenna 24.

Echoes received by the antenna 24 are supplied by the duplexer 22 to a mixer 28 via a line 26. The mixer 28 beats or heterodynes the echo signal with the RF signals supplied by RF signal generator 16 via line 30 in order to obtain the intermediate frequency echo signal varying from $F_1$ to $F_2$. The resultant intermediate frequency signal is amplified in an intermediate frequency amplifier 32 with a bandwidth from $F_1$ to $F_2$ centered on the frequency $(F_2+F_1)/2$. Since the intermediate frequency amplifier 32 passes the same band as the linear FM waveform, the intermediate frequency amplifier 32 performs noise reduction but does not perform a pulse compression function.

At this point in the circuit both the transmission and the reception processing have been analog in nature. The circuit then samples the echo signal at the Nyquist rate. The Nyquist rate is defined as twice the reciprocal of the frequency sweep or bandwidth of the linear FM waveform, or in this case $2/(F_2-F_1)$. Where conversion to baseband I and Q signals is used, Kretschmer contends the Nyquist rate would be $1/(F_2-F_1)$ for each baseband I and Q signal. However, an amplifier, such as intermediate frequency amplifier 32, providing no attenuation between F1 and F2 and high attenuation outside this band is not physically realizable. Consequently, sampling at $2/(F_2-F_1)$ or $1/(F_2-F_1)$ for each baseband I and Q signal is not adequate.

To obtain the information baseband, the intermediate frequency echo signal from intermediate frequency amplifier 32 is beat or heterodyned with a local oscillator (L.O.) intermediate frequency signal. Accordingly, an I channel and a Q channel are provided for generating baseband signals and sampling those signals at the Nyquist rate. The I channel comprises a multiplier 34 for beating or heterodyning the intermediate frequency echo signal on line 33 from amplifier 32 with an L.O. intermediate frequency signal from signal generator 10 via line 35. Likewise, a multiplier 36 in the Q channel multiplies the intermediate frequency echo signal on line 35 with an L.O. intermediate frequency signal from the signal generator 10 shifted in phase by 90° by the phase shifter 38 and provided via line 40.

The baseband I and Q signals are then passed through low pass filters 42 and 44, respectively. Kretschmer discusses that these low pass filters may be optimally adjusted to just pass baseband pulses of length $1/(F_2-F_1)$ (see col. 4 lines 30–35 of U.S. Pat. No. 4,404,562). In other words Kretschmer teaches setting the passbands of low pass filters 42 and 44 equal to the frequency sweep or bandwidth of the linear FM waveform. Accordingly since the low pass filters 42 and 44 pass the same band as the linear FM waveform, the low pass filters 42 and 44 perform noise reduction but do not perform a pulse compression function. The outputs of these low pass filters 42 and 44 are then applied to sample and hold circuits 46 and 48, respectively.

Kretschmer further teaches that to determine the optimum sampling rate for the sample and hold circuits 46 and 48 there are two competing factors which require consideration. In the ideal situation, sampling would begin at the beginning of the echo pulse. However, no provision in the circuit can be made for ensuring that sampling will begin at the beginning of the echo pulse. Accordingly, a sampling error of as much as ½ of a sampling period may exist. Kretschmer teaches reducing the sampling period or increasing the sampling rate so that the sampling error will be proportionately reduced (col. 4, lines 37–48 of U.S. Pat. No. 4,404,562). In the Kretschmer device, however, very high sampling rates reveal the sidelobe within 13 dB of the mainlobe, which is present in the typical linear FM response.

The Nyquist sampling rate is the minimum sampling rate which will allow the Kretschmer circuit to reconstruct all of the information for a given bandwidth. This rate is generally two times the reciprocal of the bandwidth, or in the case of baseband I and Q signals it is equal to the reciprocal of the bandwidth itself. Kretschmer teaches that the use of Nyquist rate sampling will provide an acceptable sampling error rate and will also provide a maximized mainlobe to sidelobe ratio (col. 4, lines 57–59 of U.S. Pat. No. 4,404,562). FIG. 5 illustrates the response of the Kretschmer system with over sampling. As FIG. 5 illustrates, the sidelobe is only 13 dB down from the mainlobe. When the Nyquist rate is used, as illustrated in FIG. 3, the sidelobe is 27 dB down from the mainlobe. As discussed above, the Nyquist rate is $1/(F_2-F_1)$ for the baseband I and Q signals. Accordingly, the sample and hold circuits 46 and 48 are driven at this rate. The sampling pulses are supplied via line 50 from the signal generator 10. The sample and hold circuits 46 and 48 hold their sample values for a time $1/(F_2-F_1)$ between the samples.

The I and Q samples from the sample and hold circuits 46 and 48 are used to modulate multipliers 52 and 54, respectively. An L.O. intermediate frequency signal is supplied to multiplier 52 in the I channel which will operate to modulate that intermediate frequency signal with the sampled I signal from the sample and hold circuit 46. Kretschmer teaches that this intermediate frequency signal may be the signal $F_1$ supplied via line 35. Likewise, the multiplier 54 in the Q channel is supplied with an L.O. intermediate frequency signal in quadrature with the intermediate frequency signal supplied to the multiplier 52. This quadrature L.O. intermediate frequency signal is modulated by the sampled Q output signal from the sample and hold circuit 48. Again, Kretschmer teaches this L.O. intermediate frequency signal may be the L.O. intermediate frequency signal $F_1$ shifted in phase by 90° and supplied via line 40. The intermediate frequency signal output from the multipliers 52 and 54 are then added together by an addition circuit 56 and the sum supplied to a compression circuit 60. The purpose of the compression circuit 60 is to take successive samples in time, and weight those samples such that when a received signal is properly indexed in the circuit, its output will be a short pulse with a significant amplitude, i.e., a compression operation.

The compression circuit 60 is a tap delay line, whose length will, of course, be determined by the uncompressed length T of the transmitted pulse. The number of taps on the delay line is generally determined by the number of samples taken in the sample and hold circuits 46 and 48. The delay line is composed of a series of p-1 cascaded delay elements 62 each equal to a delay of $\tau=T/p$ wherein $T/p = 1(F_2-F_1)$. A signal tap 64 is taken before each delay element 62 and a final tap 65 is taken after the last delay element for a total of p signal taps. The delay elements 62 may be formed by cable or standard RC transmission line cut to the proper length. Equal amounts of signal will be obtained from each tap by setting the tap impedances in the well known manner.

If the originally transmitted signal had contained a single frequency across the length of the pulse, then the signals from these p taps could be added without further processing. However, because the frequency varies with time during the length of the pulse, the signals on the individual signal taps must be progressively phase shifted back into phase. Accordingly, in order to bring the signals on the various signal taps into phase with each other, phase weighting elements 66, 68, 70 and 72 are provided for the different signal taps. The phase weights to be set in these individual phase weighting elements is determined in the well known manner as follows. For purposes of the present discussion, the phase of the signal on the last signal tap 65 will be taken as the reference. Accordingly, the phase weighting element 66 will provide a phase shift of zero. The phase shifts for the other phase weighting elements may be calculated as follows:

The frequency difference between the signals on any two taps $f_{diff}$ is $$f_{diff} = \frac{df}{dt} t \tag{1}$$

For a linear frequency modulation, as in this instance, df/dt=a constant k or $$f_{diff} = kt \tag{2}$$

also $$f_{diff} = \frac{1}{2\Pi} \frac{d\phi}{dt} \text{ where } \phi = \text{phase of the signal} \tag{3}$$

Φ diff taps $$\Phi \text{ diff between taps} = \int_0^t 2\pi \cdot f_{diff} dt \tag{4}$$

$$= \int_0^t 2\pi \cdot kt \cdot dt$$

$$= \pi kt^2$$

The constant k is found to equal the slope of the frequency vs time transmission characteristic or $(F_2-F_1)/T=B/T$. Thus, the phase weighting elements will provide the following phase shifts $$\phi_1 = 0 \tag{5}$$

$$\phi_2 = \pi \left[\frac{B}{T}\right](t^2) = \pi \left[\frac{B}{T}\right]\left[\frac{T}{p}\right]^2 = \pi/p \tag{6}$$

$$\phi_{p-1} = \pi \left[\frac{B}{T}\right] [(p-2)(T/p)]^2 \tag{7}$$

$$\phi_p = \pi (B/T) [(p-1)(T/p)]^2 \tag{8}$$

These phase weighting elements may comprise BNC cable or twisted pairs cut to the proper length in order to obtain the prescribed phase shifts.

When the linear variation of the frequency of the signal with time has been taken into account, then the output from the phase weighting elements 66 through 72 should all be in phase when a received echo pulse is properly indexed in the delay line. Accordingly, the weighted signal output from the phase weighting elements 66 through 72 are added together in an adding circuit 74.

As the discussion above reveals, the Kretschmer device may only be realized in the ideal world of computer simulations because the filter characteristics specified by Kretschmer are not physically realizable.

Furthermore, Kretschmer discusses that a sampling error of as much as ½ the sampling period may exist. FIG. 3 illustrates the response of the Kretschmer device when there is no sampling error, and FIG. 4 illustrates the response of the Kretschmer device when a sampling error of ½ a sampling period exists. A comparison of FIGS. 3 and 4 demonstrates that the peak response of the Kretschmer device degrades by 3.9 dB and the width of the main lobe widens significantly when such a sampling error exists. Therefore, as the sampling error increases, the Kretschmer device will be unable to resolve the closely spaced targets that were resolved when no sampling error was present. In the radar art, loss due to sampling error is called range sampling loss, and is often expressed as the difference between the peak signal-to-noise ratio and the signal-to-noise ratio averaged over all possible sampling points. Kretschmer's approach results in a range sampling loss of 1.5 dB.

As further discussed above, Kretschmer teaches that the performance of his device depends on the sampling rate. Specifically, reducing the sampling rate proportionally reduces the sampling error discussed above. FIG. 5 illustrates the deleterious affects of over sampling (sampling above the Nyquist rate) with the Kretschmer device. As illustrated in FIG. 5, the sidelobe is only 13 dB down from the mainlobe. When the Nyquist rate is used, as illustrated in FIG. 3, the sidelobe is 27 dB down from the mainlobe. The closer the sidelobe becomes to the mainlobe, the greater the chance of erroneous or missed target detection. For example, the sidelobes produced by clutter such as mountains or other targets could mask the mainlobe of a target and prevent detection of that target. Accordingly, Kretschmer as discussed previously mandates the use of the Nyquist sampling rate, the lowest possible sampling rate, as the sampling rate of the sample and hold circuits 46 and 48 so that the sidelobe weighting shown in FIG. 3 is obtained.

The Kretschmer device suffers from other disadvantages with respect to sidelobe suppression and the flexibility of the transmitted waveform. FIG. 6 illustrates the response of the Kretschmer device with sidelobe weighting, and is a copy of FIG. 7 in U.S. Pat. No. 4,404,562 discussed in col. 7 lines 36–42. Based on FIG. 6, the peak response of the Kretschmer device is about −3 dB, which represents a mismatch loss of 3 dB. As discussed previously, resolution and the range at which targets are detectable depend upon the energy content of the transmitted pulse. Consequently, the greater the mismatch loss, the greater the energy content of the transmitted pulse must be to overcome such a loss and obtain the desired range and resolution. A mismatch loss of 3 dB would require doubling the output power of the transmitter. In the real world, such power requirements are not economically feasible; especially with solid state devices. As such, a mismatch loss of 3 dB represents an unacceptably high mismatch loss for a practical system.

Additionally, the Kretschmer device can use only a linear FM waveform such as shown in FIG. 2 as the transmitted pulse. Consequently, the Kretschmer pulse compressor is not applicable or flexible enough to be used in a radar system using a non-linear FM waveform as the transmitted pulse.

Furthermore, Kretschmer claims that the device of U.S. Pat. No. 4,404,562 is Doppler tolerant. FIG. 7 illustrates the response of the Kretschmer device with Doppler. The Doppler chosen represents a high-speed target at L-band. A comparison of FIG. 7 to FIG. 3 shows a peak response reduction of 0.5 dB, and a significant broadening of the mainlobe. This, particularly the broadening of the mainlobe, adversely impacts the resolution of the Kretschmer system.

SUMMARY OF THE INVENTION

An objective of the present invention is to provide an apparatus and method of pulse compression which overcomes the above noted disadvantages.

Another objective of the present invention is to provide an apparatus and method of pulse compression which minimizes mismatch loss while maximizing sidelobe suppression.

A further objective of the present invention is to provide an apparatus and method of pulse compression having a response substantially unaffected by sampling error.

An additional objective of the present invention is to reduce the sampling rate to very close to the Nyquist rate, which reduces the cost of the A/D convertor, the digital pulse compressor, and primarily all subsequent digital signal processing, such as, for example, Doppler filtering.

Another objective of the present invention is to provide an apparatus and method of pulse compression having increased flexibility with respect to the transmitted pulse.

A further objective of the present invention is to provide an apparatus and method of pulse compression which is Doppler tolerant.

A further objective of the present invention is to provide a method of using a pulse compressor which overcomes the above noted disadvantages and achieves the above discussed objectives.

An additional objective of the present invention is to provide a method of manufacturing a pulse compressor which overcomes the above noted disadvantages and achieves the above discussed objectives.

The above and other objectives are achieved by providing a hybrid analog-digital pulse compressor, comprising an analog intermediate frequency filter receiving echo signals of a transmitted pulse and having a passband less than a frequency sweep of said transmitted pulse, said analog intermediate frequency filter filtering and weighting said echo signals; converting means for converting output of said analog intermediate frequency filter into digital baseband signals; and a digital correlator for digitally correlating said digital baseband signals to complete pulse compression of said echo signals.

These objectives are further achieved by providing a method of pulse compression, comprising a) receiving echo signals of a transmitted pulse; b) filtering and weighting said echo signals with an analog intermediate frequency filter having a passband less than a frequency sweep of said transmitted pulse; c) converting output of said analog intermediate frequency filter into digital baseband signals; and d) digitally correlating said digital baseband signals with a digital correlator to complete pulse compression of said echo signals.

These objectives are also achieved by providing a method of using a pulse compressor, comprising a) providing an analog intermediate frequency filter with a passband less than a frequency sweep of a transmitted pulse; b) providing a converting means which converts analog signals into digital baseband signals; c) providing a digital correlator which digitally correlates baseband data signals; d) receiving echo signals of said transmitted pulse with said analog intermediate frequency filter; e) filtering and weighting said echo signals with said analog intermediate frequency filter; f) converting output of said step e) with said converting means to form digital baseband data signals; and g) digitally correlating output of said step (f) using said digital correlator.

These objectives are further achieved by providing a method of manufacturing a pulse compressor, comprising a) determining a time domain structure of a transmitted pulse; b) determining a desired frequency response of a pulse compressor based on said time domain structure of said transmitted pulse; c) selecting an analog intermediate frequency filter with a passband less than a frequency sweep of said transmitted pulse; d) determining a frequency response of said selected analog intermediate frequency filter; e) providing a converting means which converts analog signals to digital baseband signals; f) connecting an input of said converting means to an output of said selected analog intermediate frequency filter; g) selecting a digital correlator which digitally correlates and compresses digital baseband data signals and has a frequency response substantially equal to said desired frequency response of said pulse compressor divided by said frequency response of said selected analog intermediate frequency filter; and h) connecting an output of said converting means to an input of said digital correlator.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DETAILED DESCRIPTION OF THE PREFERRED EMBODIMENTS

Figure 1:
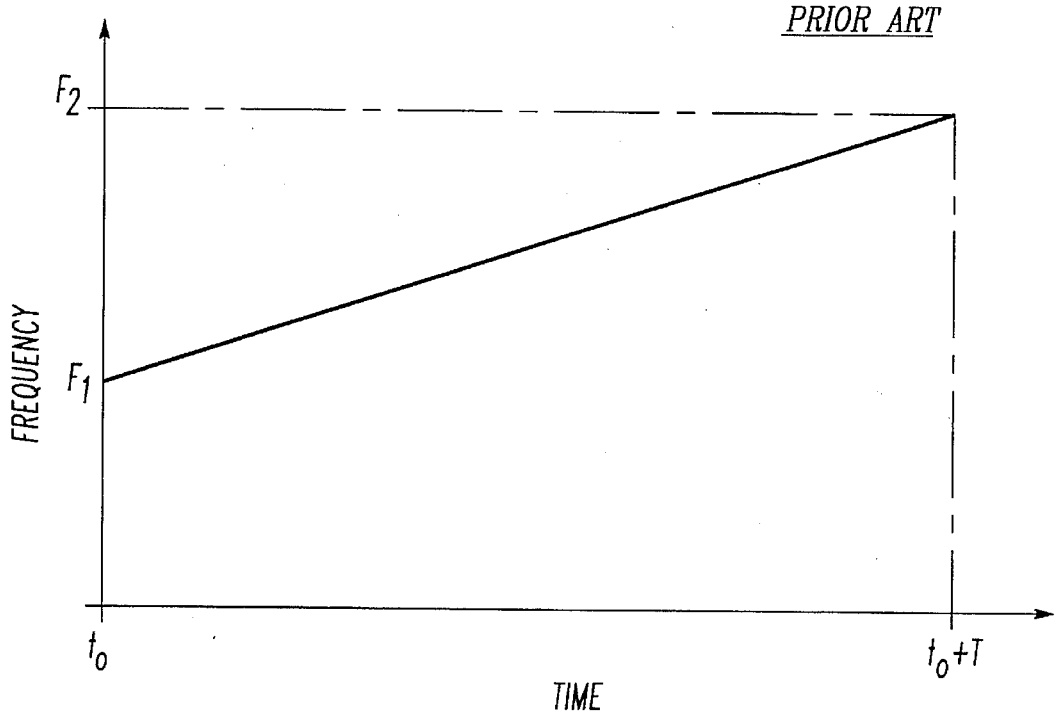
FIG. 1 illustrates the frequency sweep of a linear FM signal transmitted according to the prior art.
Figure 11:
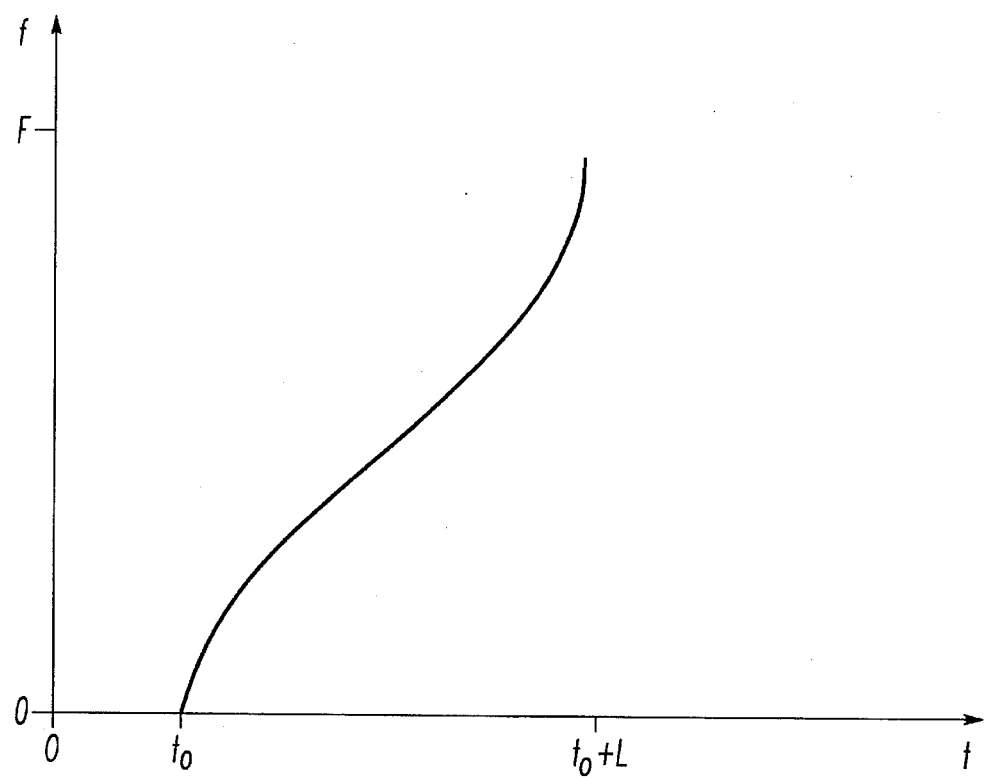
FIG. 11 illustrates the frequency sweep of a nonlinear FM waveform transmitted according to the present invention.
Figure 2:
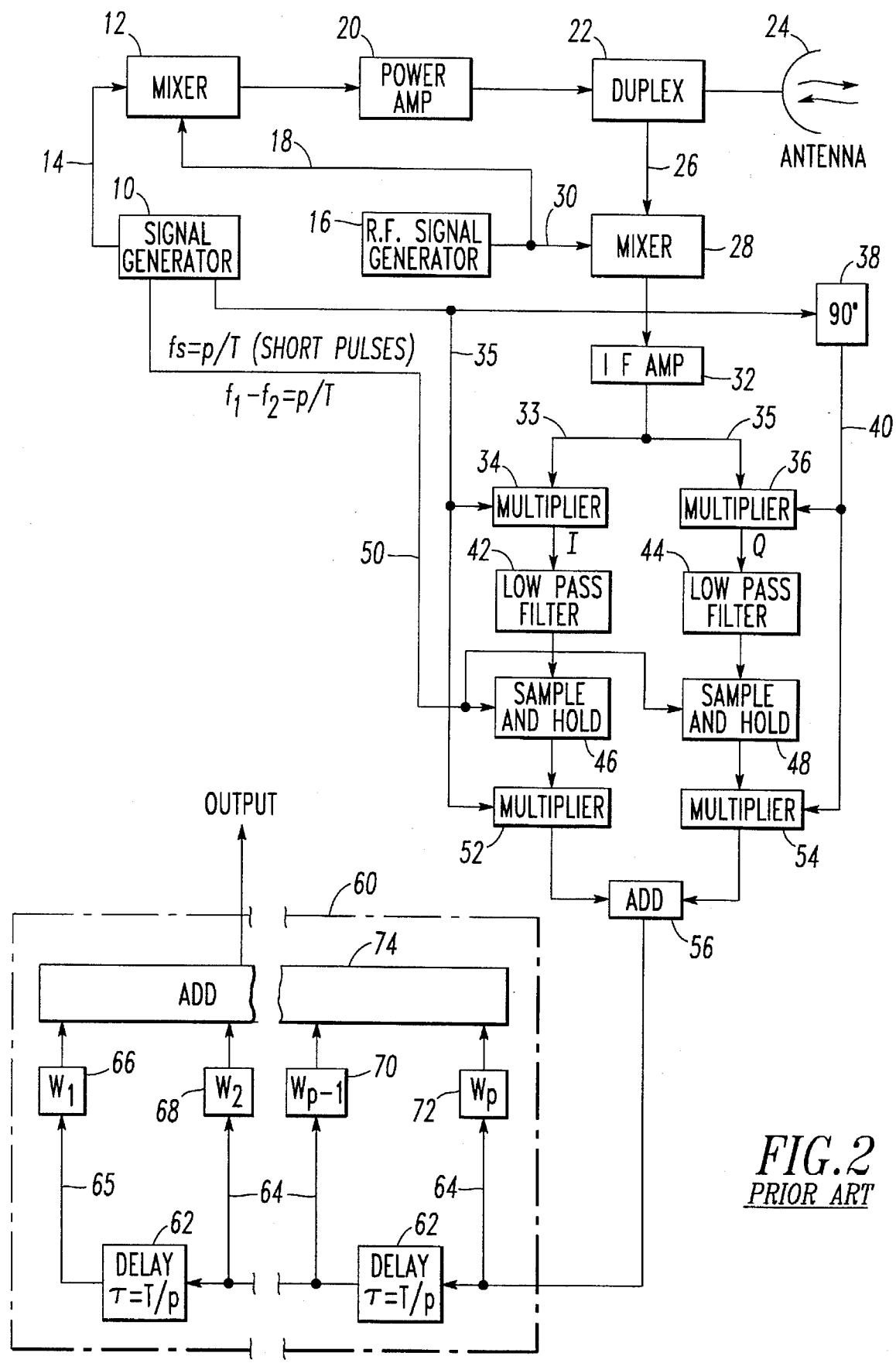
FIG. 2 illustrates a prior art pulse compressor.
Figure 8:
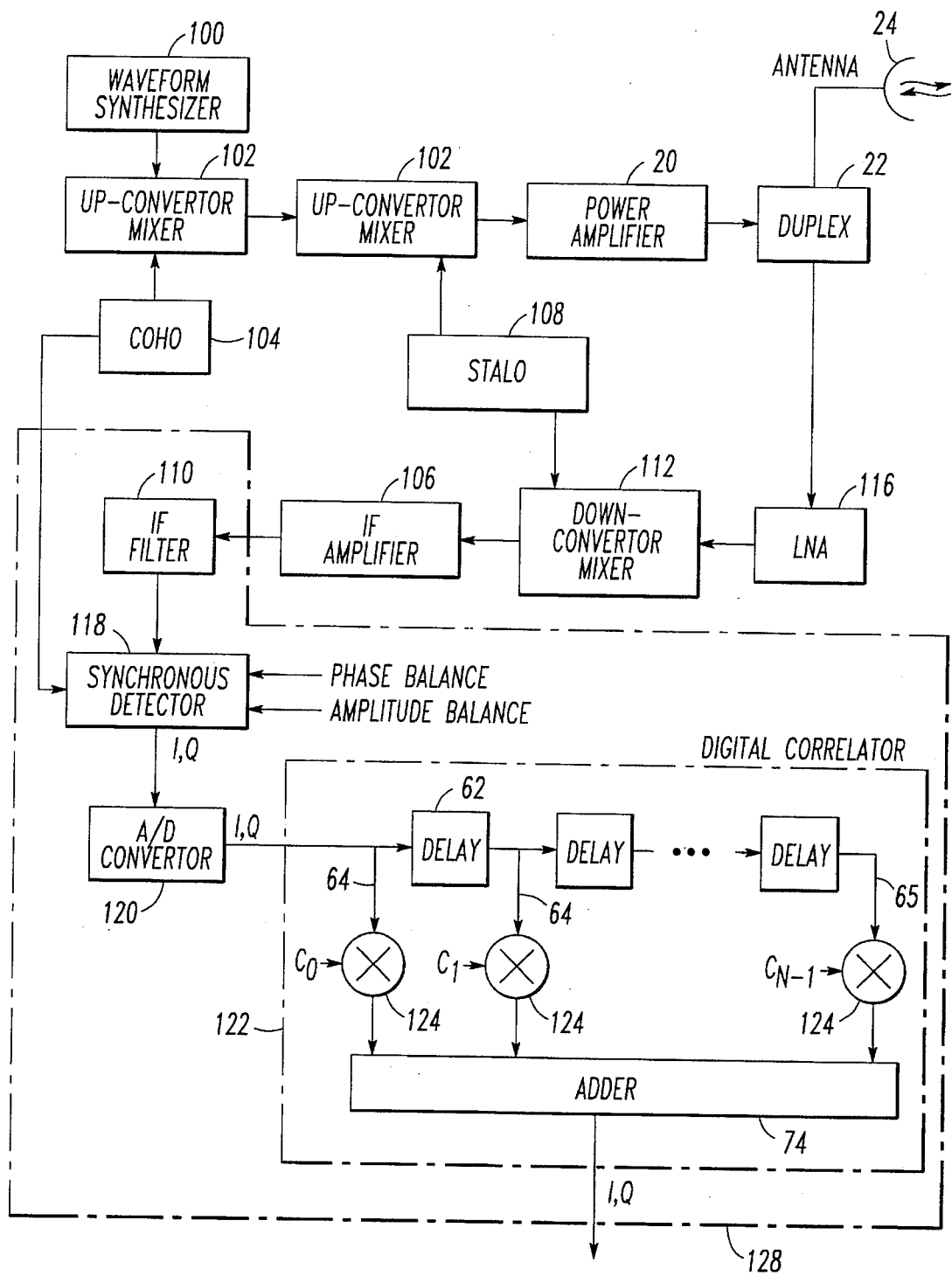
FIG. 8 illustrates a pulse compressor according to a first embodiment of the present invention.

FIG. 8 illustrates a radar system with the hybrid analog-digital pulse compressor of the present invention. In FIG. 8, a waveform synthesizer 100 generates a non-linear FM waveform. While the present invention will be described with respect to the generation of a non-linear FM waveform, waveform synthesizer 100 can also, alternatively, generate a linear FM waveform. The instantaneous frequency of the non-linear FM waveform generated by the waveform synthesizer 100 is illustrated in FIG. 11. The non-linear FM waveform has a pulse length L and a frequency sweep (bandwidth) of F.

Two up-converter mixers 102 are connected in series to the waveform synthesizer 100. Each up-converter mixer 102 mixes or heterodynes the non-linear FM waveform with an RF signal to convert the non-linear FM waveform to radio frequency. In this embodiment, double conversion (i.e., two up-converters 102) are used.

The coherent oscillator 104 and stable local oscillator 108 are connected to respective up-converter mixers 102. Each of coherent oscillator 104 and stable local oscillator 108 generates an RF signal which is mixed with the non-linear FM waveform by a respective one of the up-converter mixers 102 to up-convert the non-linear FM waveform to radio frequency.

The output of the final up-converter mixer 102 is supplied to power amplifier 20, which amplifies the non-linear FM waveform. A standard duplexer 22 receives the output of power amplifier 20, and passes the output of power amplifier 20 to an antenna 24. The antenna 24 then radiates the up-converted and amplified non-linear FM waveform.

Echoes received by the antenna 24 are supplied by the duplexer 22 to low noise amplifier 116. The low noise amplifier 116, amplifies the echoes passed by the duplexer 22. Since the low noise amplifier 116 sets the noise for the system, in a preferred embodiment low noise amplifier 116 is utilized; however, a conventional amplifier may be used as well. The low noise amplifier 116 is a component well known to those skilled in the art.

A down-converter mixer 112 is connected to the output of the low noise amplifier 116. The down-converter mixer 112 receives the RF signals generated by the stable local oscillator 108, and mixes down the received echoes by heterodyning the echoes with the RF signal supplied by the stable local oscillator 108.

The resultant intermediate frequency echo signal is output to an intermediate frequency amplifier 106. The intermediate frequency amplifier 106 amplifies the intermediate frequency signal output from the down-converter mixer 112.

PULSE COMPRESSOR—FIRST EMBODIMENT

The following is a detailed description of the pulse compressor according to the first embodiment of the present invention and its operation. The intermediate frequency filter 110 which receives the output of the intermediate frequency amplifier 106 is the first stage of the pulse compressor 128.

The intermediate frequency filter 110 filters the output of the intermediate frequency amplifier 106, and outputs a weighted intermediate frequency signal to synchronous detector 118. The passband of the intermediate frequency filter 110 is set less than the frequency sweep of the non-linear FM waveform. Consequently, the intermediate frequency filter 110 performs some weighting to reduce the resulting compressed pulse sidelobes output by the digital correlator 122.

The hybrid analog-digital pulse compressor 128 of the present invention is just that—part analog and part digital. Accordingly, any mismatch loss introduced by intermediate frequency filter 110 is accounted for by the digital correlator 122 (described below). The selection of the passband for Intermediate frequency filter 110 and the design of the pulse compressor according to the present invention is discussed in detail below.

The synchronous detector 118 is a well known component that transforms an intermediate frequency signal input into baseband I and Q signals. Specifically, the synchronous detector 118 includes two signal paths (not shown). In the first signal path the synchronous detector 118 heterodynes the weighted intermediate signal with the RF signal from coherent oscillator 104 to produce the baseband I signal. In the second signal path the synchronous detector 118 heterodynes the weighted intermediate frequency signal with the RF signal from coherent oscillator 104 phase shifted by 90 degrees to produce the baseband Q signal. The RF signal from coherent oscillator 104 may be the same RF signal output by coherent oscillator 104 to the up-converter 102. The synchronous detector 118 also receives a phase balance control signal and an amplitude balance control signal. These control signals are feedback signals generated according to a well known technique. The synchronous detector 118 uses these control signals to maintain equal gain and the 90 degree phase difference between the baseband I and Q signals according to well known techniques. In this embodiment, the baseband I and Q signals are multiplexed for processing, but these signals may be processed along separate signal paths.

The analog-to-digital (A/D) converter 120 converts the analog baseband I and Q signals output from the synchronous detector 118 into digital baseband I and Q signals. The digital correlator 122 receives the digital baseband I and Q signals and digitally correlates the baseband I and Q signals to complete the pulse compression.

In a preferred embodiment of the present invention, the digital correlator 122 is implemented using a digital signal processor such as the IMS A100 chip produced by SGS Thomson. For the purposes of description, however, FIG. 8 illustrates the digital correlator 122 as a functional block diagram so that the processing of the digital baseband I and Q signals may be more easily understood. Furthermore, the tapped delay line embodiment of the digital correlator illustrated in FIG. 8 may be implemented with hardware components corresponding to the functional blocks as described below.

The digital correlator 122 includes delay elements 62, taps 64, final tap 65, multipliers 124 with tap weights $C_0, C_1,$ ... $C_{N-1}$, and an adder 74. The N–1 delay elements 62, which have a delay of $\tau = T/N$ (where T is the period of a transmitted pulse and N is the total number of taps), are connected in series to the output of the analog-to-digital converter 120. Since the initially determined number of taps is usually a power of 2, the digital correlator may be much longer than the transmitted pulse. For this situation, the tap weights outside the pulse length will be small compared to the other tap weights, and may be eliminated until the digital correlator length is comparable to the pulse length.

The taps 64 tap the digital baseband I and Q signals before being passed through each of the delay elements 62. The final tap 65 taps the output of the last delay element 62. The multipliers 124 receive the outputs of the taps 64 and the final tap 65, and multiply the signal tapped by each tap 64 and the final tap 65 by the tap weights $C_0$–$C_{N-1}$, respectively. The determination of the tap weights $C_0$–$C_{N-1}$ is discussed in detail below with respect to the design of the pulse compressor according to the present invention. The outputs of the multipliers 124 are added by adder 74 to output the pulse compressed digital baseband I and Q signals.

As discussed above, the digital correlator 122 of the present invention may be a tap delay line implemented with digital hardware components corresponding to the functional blocks. However, an integrated circuit device, such as the IMS A100, is preferred since such a device is much less costly because each chip contains a multiplicity of those digital elements.

PULSE COMPRESSOR—SECOND EMBODIMENT

Figure 9:
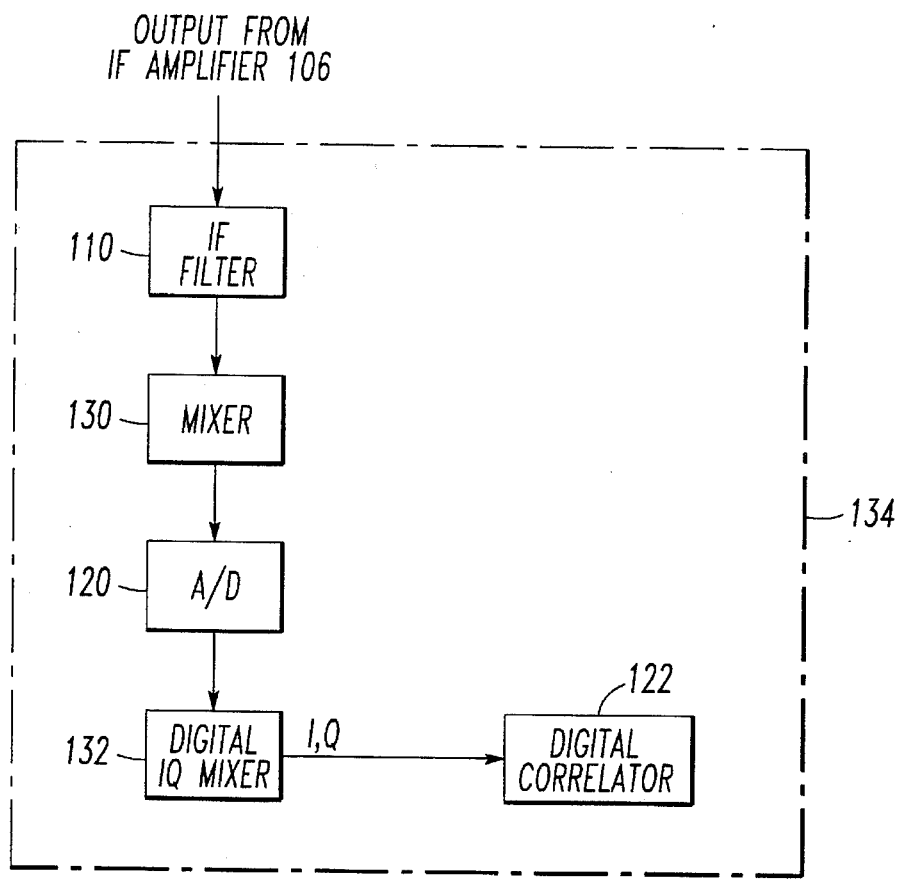
FIG. 9 illustrates a pulse compressor according to a second embodiment of the present invention.

The following is a description of the pulse compressor according to a second embodiment of the present invention illustrated in FIG. 9 and its operation. Like reference numerals designate like elements. Therefore, elements and their operation described above with respect to the pulse compressor of the first embodiment of the present invention illustrated in FIG. 8 will not be repeated.

As illustrated in FIG. 9, the intermediate frequency filter 110 receives the output of the intermediate frequency amplifier 106. The intermediate-frequency filter 110 filters the intermediate-frequency signal output from the intermediate-frequency amplifier and generates a weighted intermediate frequency signal. As discussed above with respect to the pulse compressor of the first embodiment, the design of the intermediate frequency filter 110 is described in detail below.

The mixer 130 receives the output of the intermediate frequency filter 110, and mixes-down the weighted intermediate-frequency signal to center the weighted intermediate frequency signal at a lower intermediate frequency prior to analog-to-digital conversion. This operation allows A/D converter 120 to operate at a lower sampling rate.

The A/D converter 120 converts the analog output of the mixer 130 to the digital domain. The digital mixer 132 receives the digital output of the A/D converter 120. The digital mixer 132 includes two signal paths (not shown). In the first signal path, the output of the A/D converter 120 is mixed down to baseband, using a digital version of the lower intermediate frequency signal to produce the digital baseband I signal. In the second signal path, the output of the A/D converter 120 is mixed down to baseband, using a digital version of the lower intermediate frequency signal shifted by 90 degrees, to produce the digital baseband Q signals. Note that the A/D in the second embodiment must be run at a rate of at least twice the rate of the first embodiment, in order to satisfy the Nyquist criterion. However, after digital I and Q formation, the sampling rate of the digital data can be reduced to that of the first embodiment. The advantage of performing the down-conversion to baseband, digitally, is that control signals such as the phase and amplitude balance control signals are not necessary to maintain the 90 degree phase difference between the baseband I and Q signals. Thus, the second embodiment involves a more expensive A/D convertor in exchange for elimination of gain and phase balance circuits. In some applications this will be a favorable trade-off leading to a lower cost for the second embodiment.

The digital correlator 122 receives the digital baseband I and Q signals, performs the digital correlation thereon, and outputs the compressed pulses. The implementation of digital correlator 122 was discussed above with respect to the first embodiment of the pulse compressor and will not be repeated here. The design of the pulse compressor according to the second embodiment is described in detail below.

DIGITAL CORRELATOR—ALTERNATIVE EMBODIMENT

Figure 10:
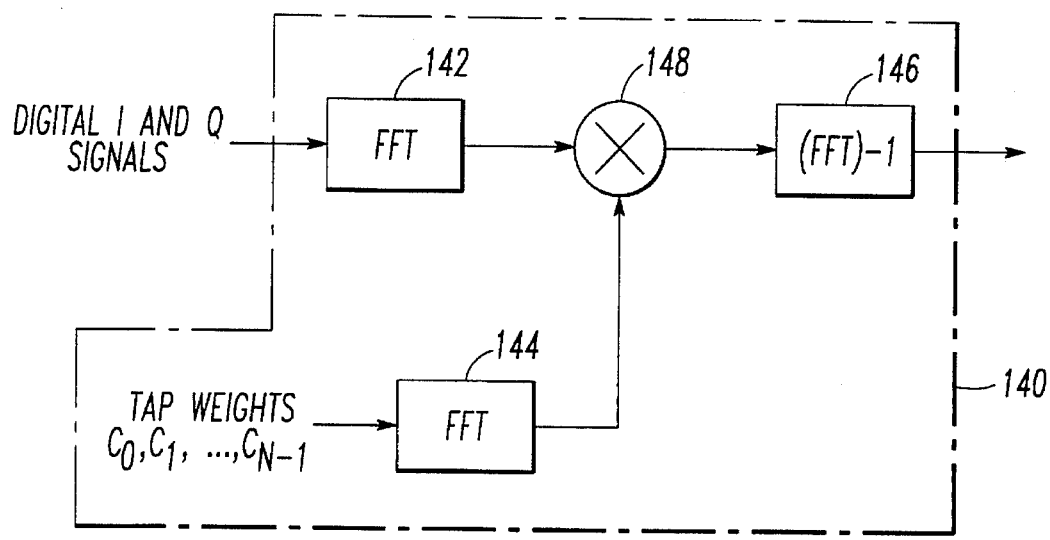
FIG. 10 illustrates an alternative embodiment for the digital correlator in the first and second embodiments of the present invention.

Next an alternative embodiment and its operation for the digital correlator of the present invention will be described. This alternative embodiment of the digital correlator may be used with either analog or digital I and Q data generators (synchronous detectors). FIG. 10 illustrates an alternative embodiment of the digital correlator used in the pulse compressor of the present invention. The digital correlator 140 illustrated in FIG. 10 can be used instead of digital correlator 122 in the first and second embodiments illustrated in FIGS. 8 and 9. The digital correlator 140 illustrated in FIG. 10 includes a first FFT (Fast Fourier Transform) circuit 142, a second FFT circuit 144, an inverse FFT circuit 146, and a multiplier 148.

The first FFT circuit 142 receives the digital baseband I and Q signals and fast Fourier transforms them. The second FFT circuit 144 receives the tap weights $C_0, C_1, \ldots C_{N-1}$, and fast Fourier transforms these tap weights. The multiplier 148 multiplies the fast Fourier transformer of the digital baseband I and Q signals with the fast Fourier transform of the tap weights, and outputs the result to inverse FFT circuit 146. The inverse FFT circuit 146 performs inverse fast Fourier transform on the output of multiplier 148 to generate the pulse compressed signals.

In this embodiment, it is preferable to use a digital signal processor integrated circuit device specifically designed to perform FFT's and inverse FFT's; although, this embodiment may be implemented using hardware components.

DESIGN OF THE PULSE COMPRESSOR

The following detailed description of the design of the pulse compressor according to the present invention applies to all the above described embodiments of the pulse compressor and alternative embodiments of the digital correlator. In designing a pulse compressor, mismatch loss should be minimized, because too great a mismatch loss causes such a large increase in transmission power requirements as to make the system impractical. Unfortunately, the more the mismatch loss is reduced the more difficult it becomes to suppress the sidelobes. Generally the specifications for a desired radar system will set the amount of sidelobe to mainlobe reduction required for targets of a given velocity so that accurate detection of these targets at a given range may be achieved. Consequently, there exists a trade off between reducing the mismatch loss and sidelobe suppression. The pulse compressor of the present invention minimizes mismatch loss while maximizing sidelobe suppression.

There exist well-known techniques for determining the transfer function of a perfectly matched analog system (mismatch loss of zero) for a known signal. Additionally, techniques for including sidelobe weighting in the transfer function, at the expense of some mismatch loss, are also known. Such a system may be termed a mismatched filter. Since the transmitted waveform and the sidelobe weighting function of a system including the pulse compressor of the present invention is known, the impulse response $h_M(t)$ of the desired mismatched analog prototype pulse compressor is also known.

In the digital pulse compressor system described by Kretschmer, the digital pulse compressor is designed so that its impulse response approximates the matched filter. Kretschmer's intermediate-frequency filter, however, assumes a rectangular magnitude response which is not realizable. In actuality, however, a realizable filter would be used and it would degrade the system performance relative to the ideal system.

By contrast the present invention accounts for the effects of both the analog and digital components in the design. In designing the pulse compressor of the present invention the desired transfer function, $H_M(\omega)$, thereof is given by:

$$H_M(\omega) = H_F(\omega) H_D(\omega) \qquad (9)$$

where $H_M(\omega)$ is the Fourier transform of $h_M(t)$; $H_F(\omega)$ is the Fourier transform of the intermediate frequency filter's impulse response $h_F(t)$; $H_D(\omega)$ is the Fourier transform of the digital correlator's impulse response $h_D(t)$. The transfer function $H_D(\omega)$ of the digital correlator can be expressed as follows:

$$H_D(\omega) = \sum_{n=0}^{N-1} C_n e^{-j\omega nT} \qquad (10)$$

where the $C_n$'s are the correlator tap weights, N is the number of taps and T the sampling period. The impulse responses $h_M(t)$, $h_F(t)$ and $h_D(t)$ are also defined so that $t=0$ is the center of these responses. This makes $H_F(\omega)$ generally have a flat phase function, and the $H_M(\omega)$ and $H_D(\omega)$ have symmetrical phases about $\omega=0$.

Figure 16:
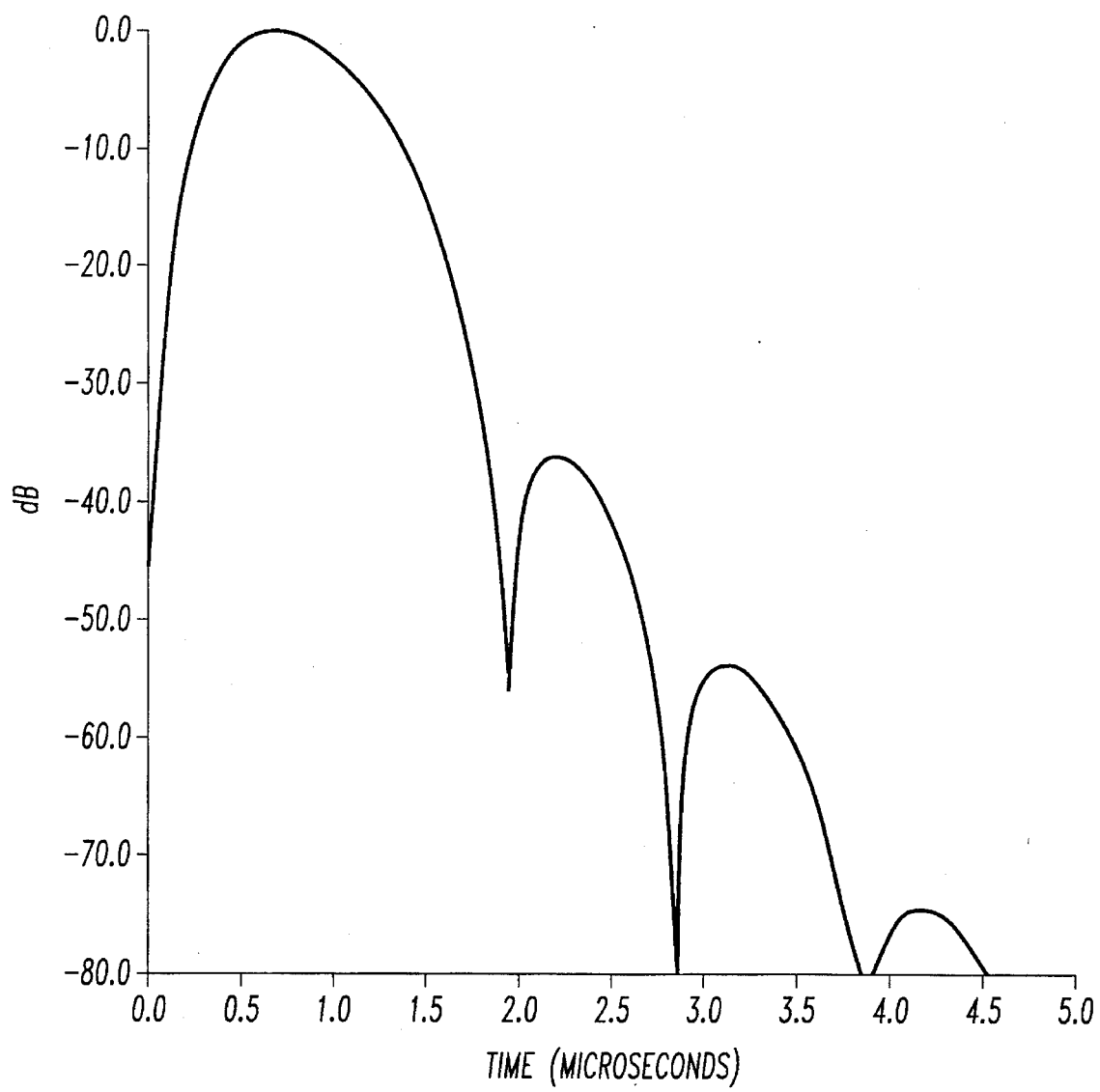
FIG. 16 illustrates the impulse response of a Bessel intermediate frequency filter according to the present invention.

Design begins with choosing an intermediate frequency filter 110 preferably having a transfer function which provides rapid falloff in both frequency and time domains, and having a passband less than the bandwidth of the transmitted waveform. In a preferred embodiment of the present invention, a Bessel filter is chosen; although other filters with low impulse response overshoots may be used. Additionally, applicants have determined empirically that it is preferable to set the 6 dB bandwidth of the Bessel filter around 82% of the frequency sweep for a non-linear FM waveform. In a preferred embodiment, the frequency sweep of a non-linear FM waveform was chosen to be 1.3 MHz, and the 6 dB bandwidth of the Bessel filter was therefore set to 1.07 MHz. The impulse response of the Bessel intermediate frequency filter, $h_F(t)$, is shown in FIG. 16.

In view of the above, both the transfer function for the pulse compressor $H_M(\omega)$ and the intermediate frequency filter 110 $H_F(\omega)$ will be known. Accordingly, the corresponding impulse responses $h_M(t)$ and $h_F(t)$ are also known. Accordingly, the transfer function for the digital correlator can be determined from the following expression:

$$H_D(\omega) = \frac{H_M(\omega)}{H_F(\omega)} \quad (11)$$

$H_M(\omega)$ is non-periodic; therefore, $H_D(\omega)$ is non-periodic. Accordingly, $h_D(t)$ cannot be characterized digitally and must be approximated. To approximate, $h_D(t)$, $h_M(t)$ and $h_F(t)$ are sampled at the same rate as set for the A/D converter 120. By sampling the desired impulse response $h_M(t)$, and the intermediate frequency filter response $h_F(t)$ at the A/D sampling rate, any aliasing effects that are present in the system are included in the design procedure.

The digital impulse response $h_M(t)$ and $h_F(t)$ are fast Fourier transformed. The fast Fourier transform of the digital impulse response $h_M(t)$ results in a periodic set of N equally-spaced frequency components representing $H_M(\omega)$. Each sample of $H_M(\omega)$ is then divided by a corresponding sample of $H_F(\omega)$ to yield samples of $H_D(\omega)$ according to expression (11). Taking the inverse fast Fourier transform of $H_D(\omega)$ yields another set of equally spaced values that correspond to the N tap weights $C_0, C_1, \ldots, C_{N-1}$ of the digital correlator.

In a preferred embodiment, applicants further fine tune the passband of the intermediate frequency filter 110 by performing various iterations of pulse compression with the 6 dB bandwidth of the intermediate frequency filter 110 varied about the initially selected passband (e.g., 82% of the bandwidth for the non-linear FM waveform in the preferred embodiment of a Bessel filter) using the digital correlator determined as above. The passband selected is the one which minimizes mismatch loss while satisfying sidelobe level requirements.

As discussed above, other types of filters may be used for intermediate frequency filter 110. The initial passband for such filters may easily be determined empirically by one skilled in the art.

Figure 17:
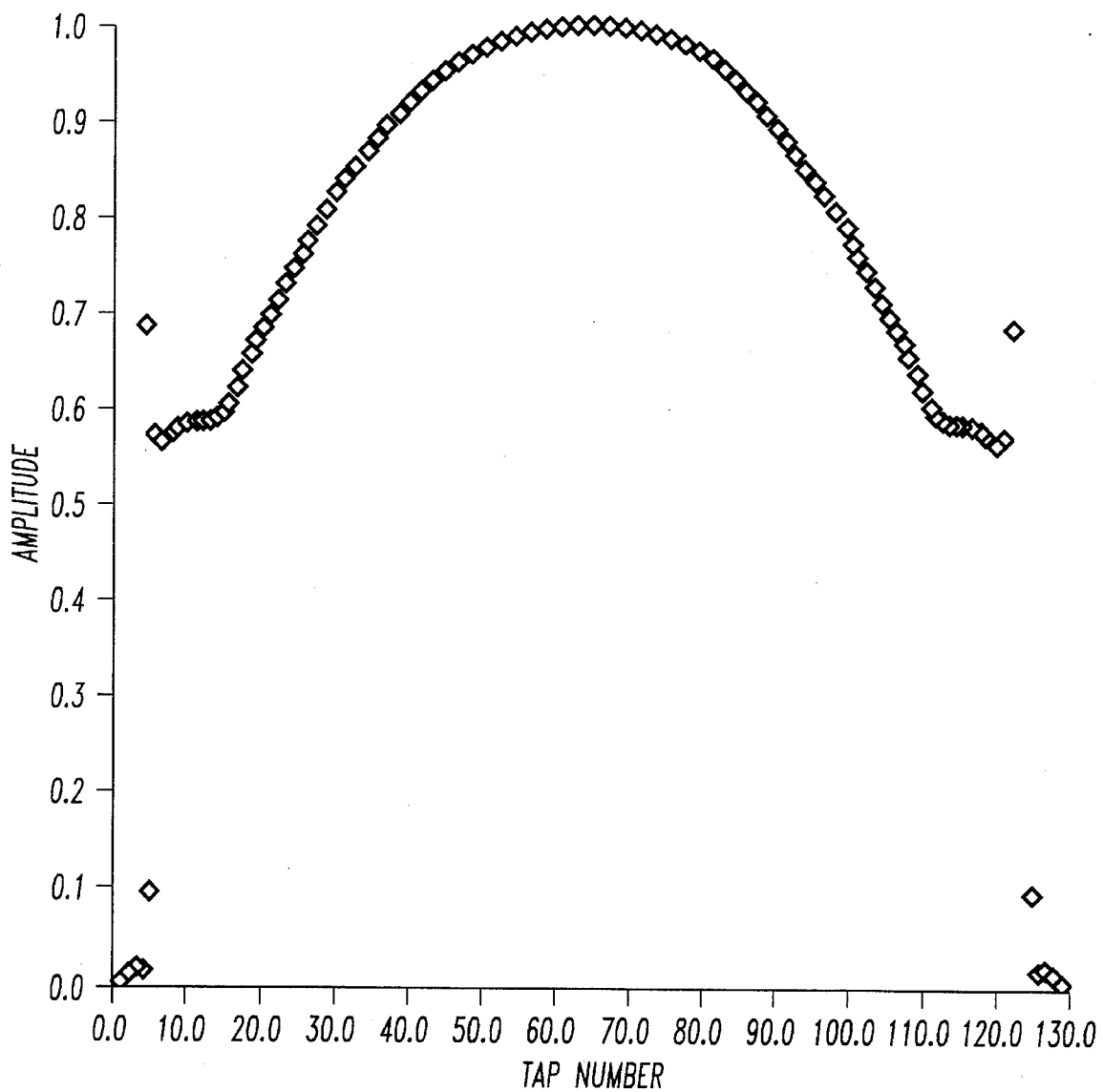
FIGS. 17 and 18 illustrate the amplitude and phase values for the tap weights of the digital correlator according to the present invention.
Figure 18:
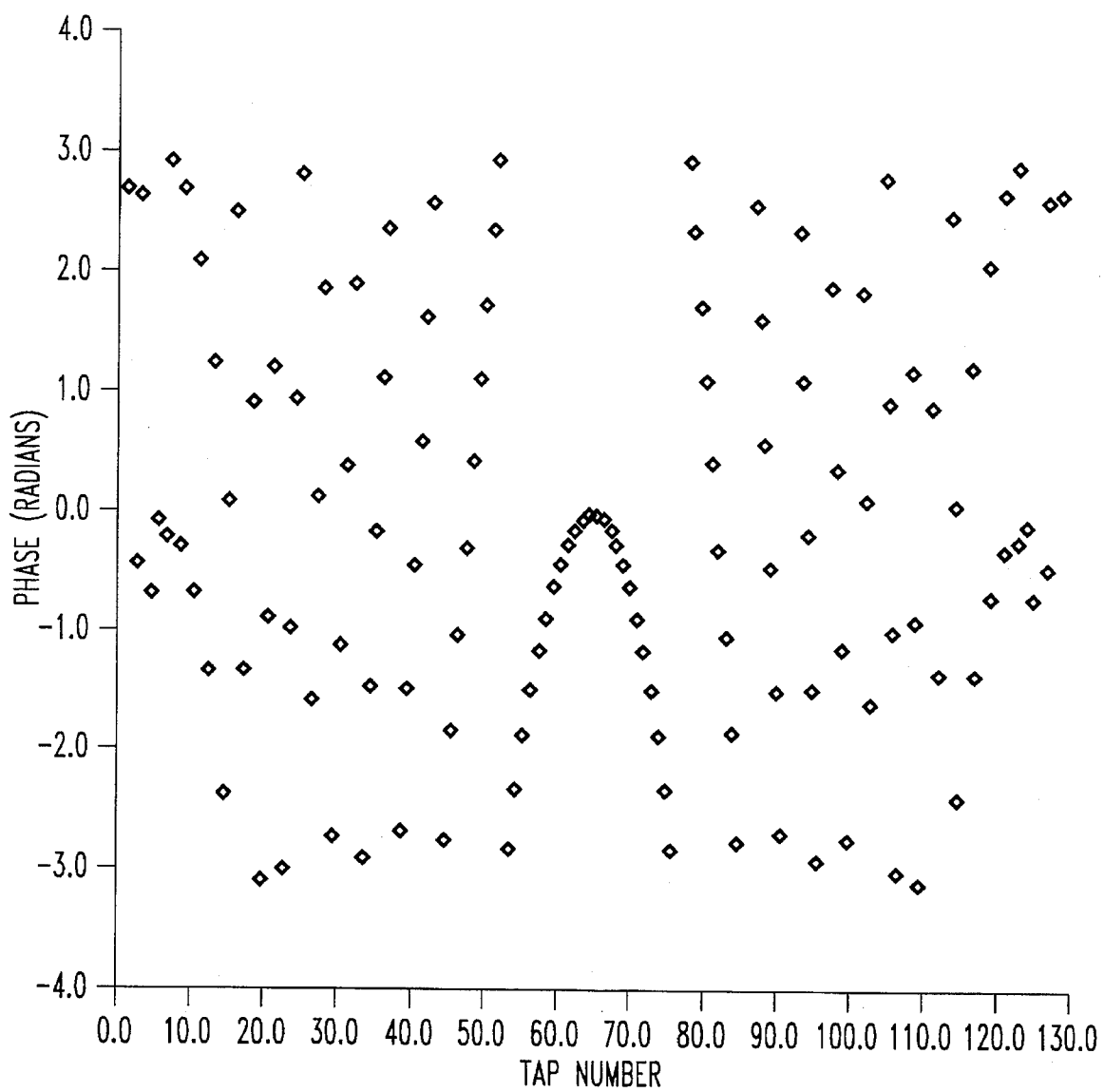

As the discussion above reveals, the pulse compressor according to the present invention is physically realizable with known components. Furthermore, the performance of the pulse compressor is significantly superior to conventional pulse compressors. In a preferred embodiment, a 90 microsecond pulse was modulated with a frequency sweep of 1.3 MHz according to the non-linear FM function depicted in FIG. 11. The A/D rate was 1.3 MHz, and the sampled pulse consisted of 117 samples. The tap weights for the digital correlator were designed according to the previously discussed procedure, and their amplitude and phase values are shown in FIGS. 17 and 18. Note that 128 tap values are shown because it was convenient to use a 128 point FFT algorithm. The first 5 and the last 5 tap values, however, can be omitted without impacting the compressor response because they have very small amplitudes.

Figure 3:
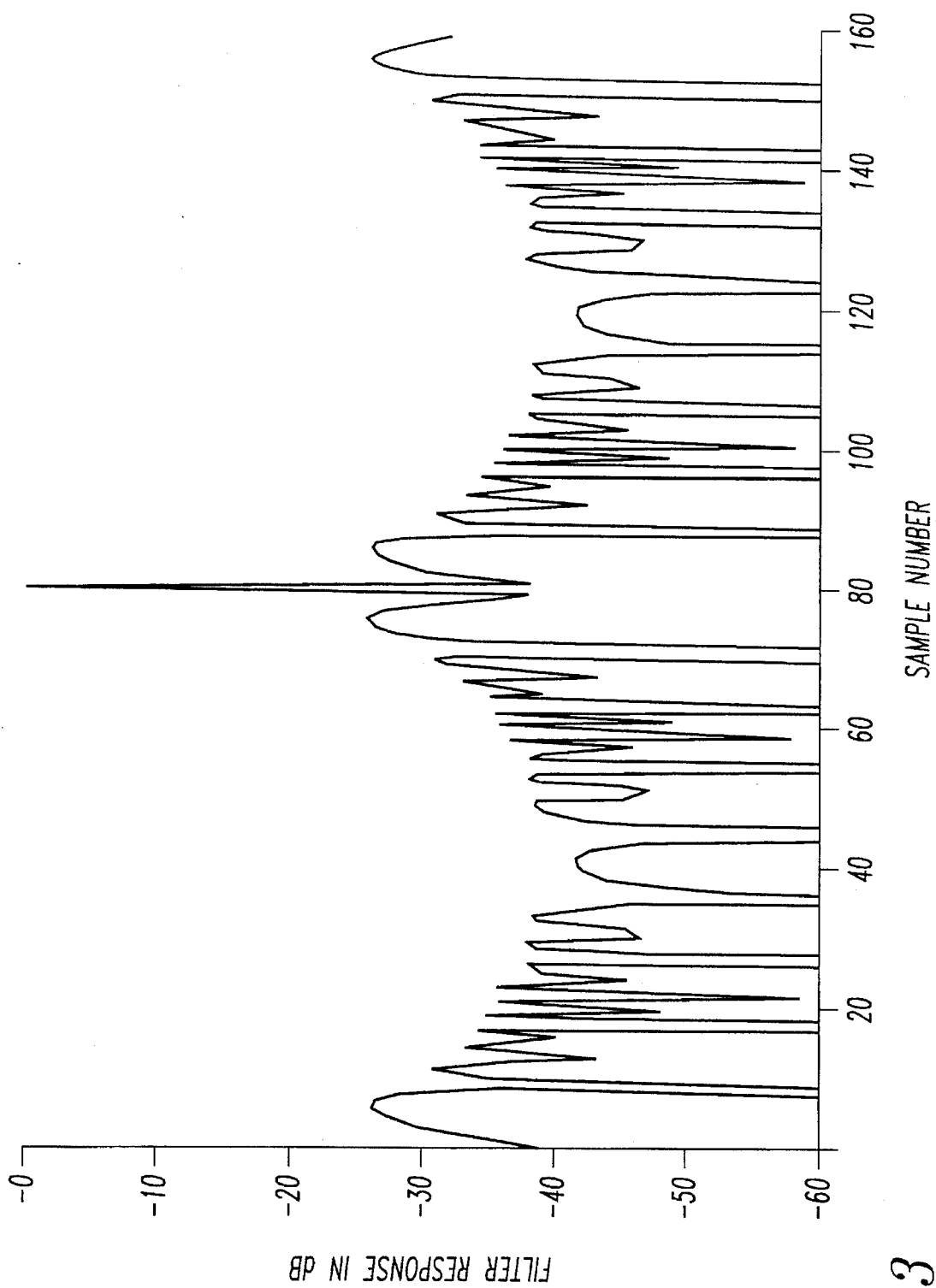
FIG. 3 illustrates the response of the prior art pulse compressor of FIG. 2 without sampling error.
Figure 4:
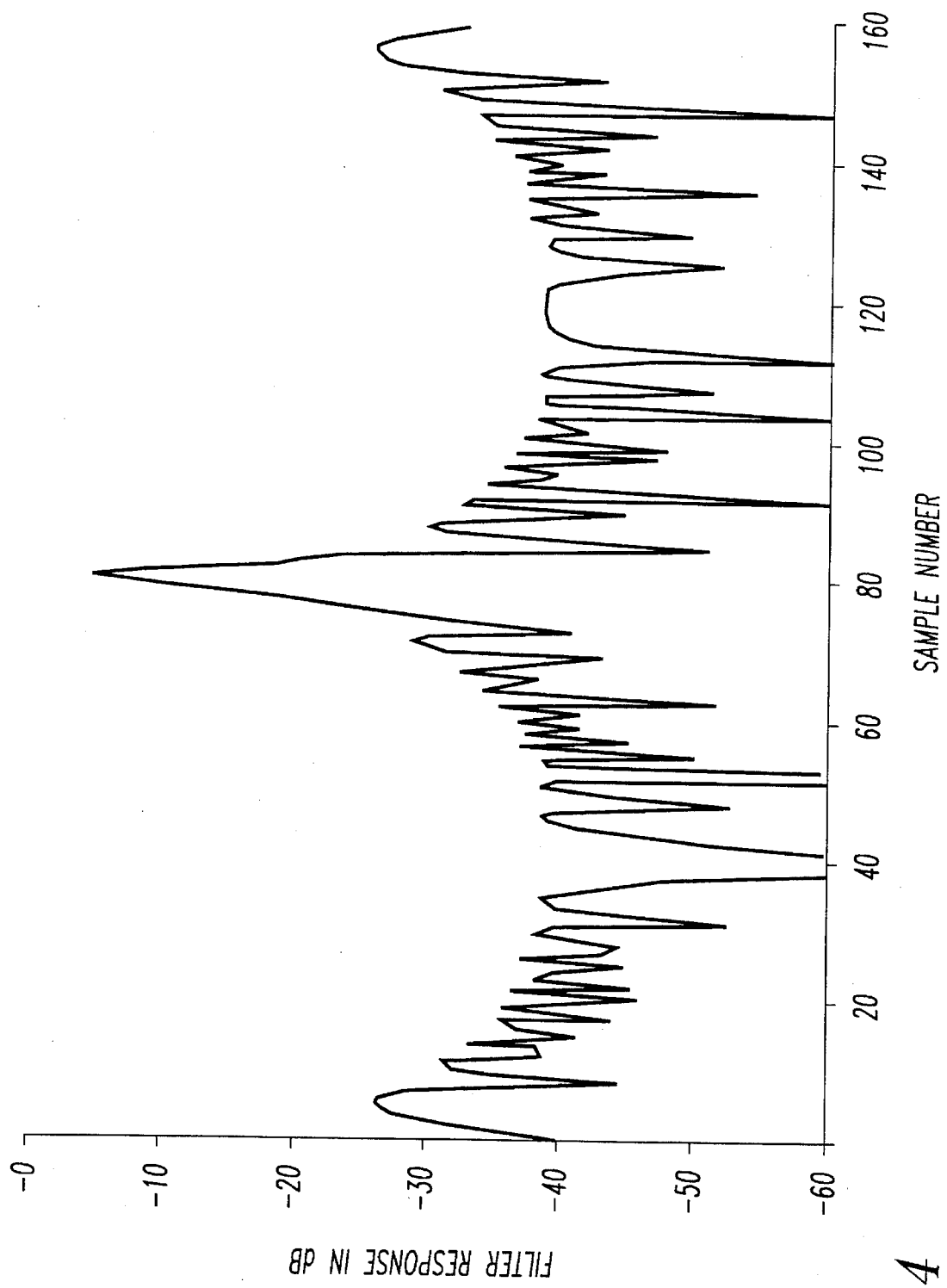
FIG. 4 illustrates the response of the prior art pulse compressor of FIG. 2 with sampling error.
Figure 5:
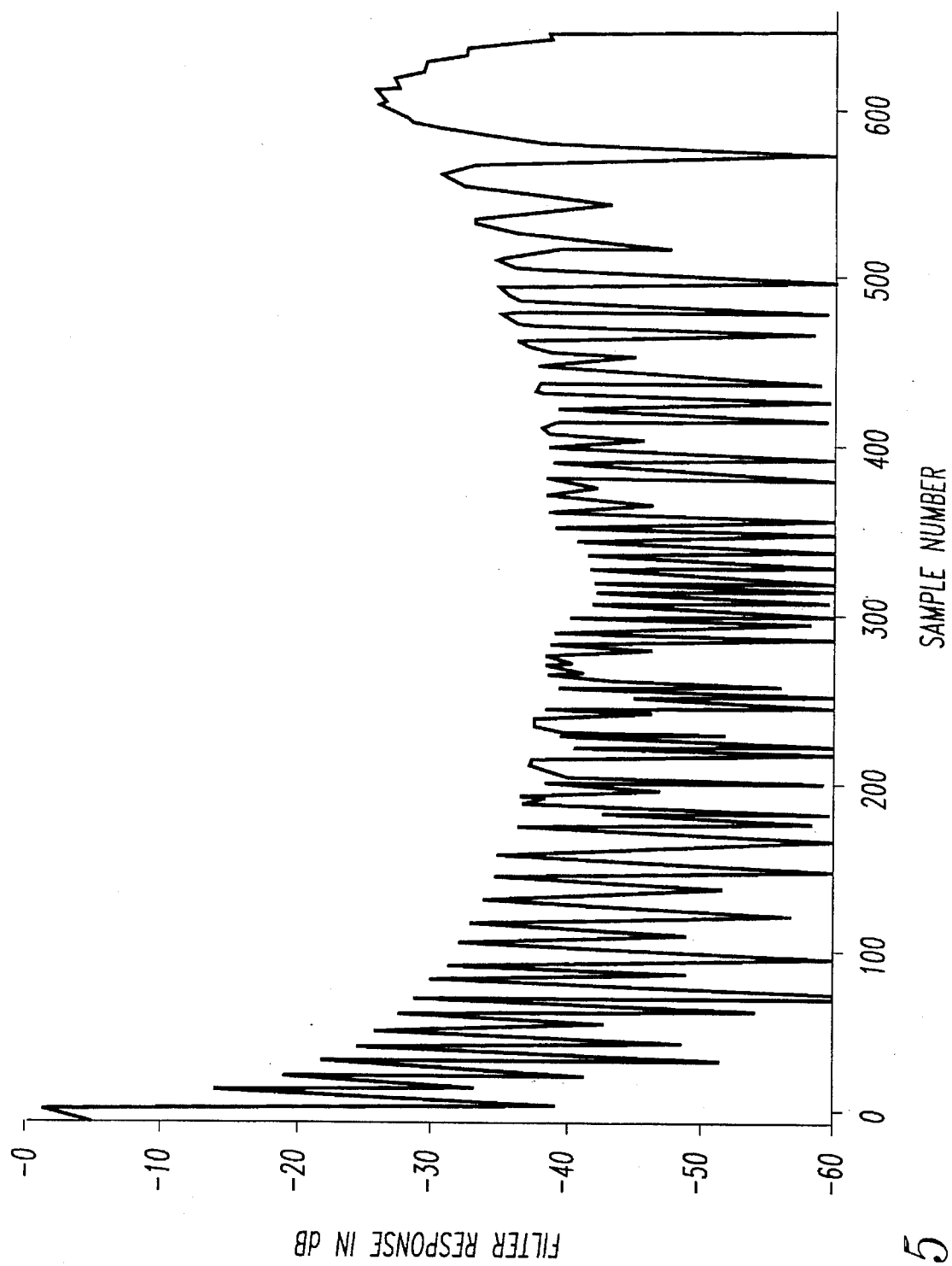
FIG. 5 illustrates the deleterious effects of over sampling on the prior art pulse compressor of FIG. 2.
Figure 6:
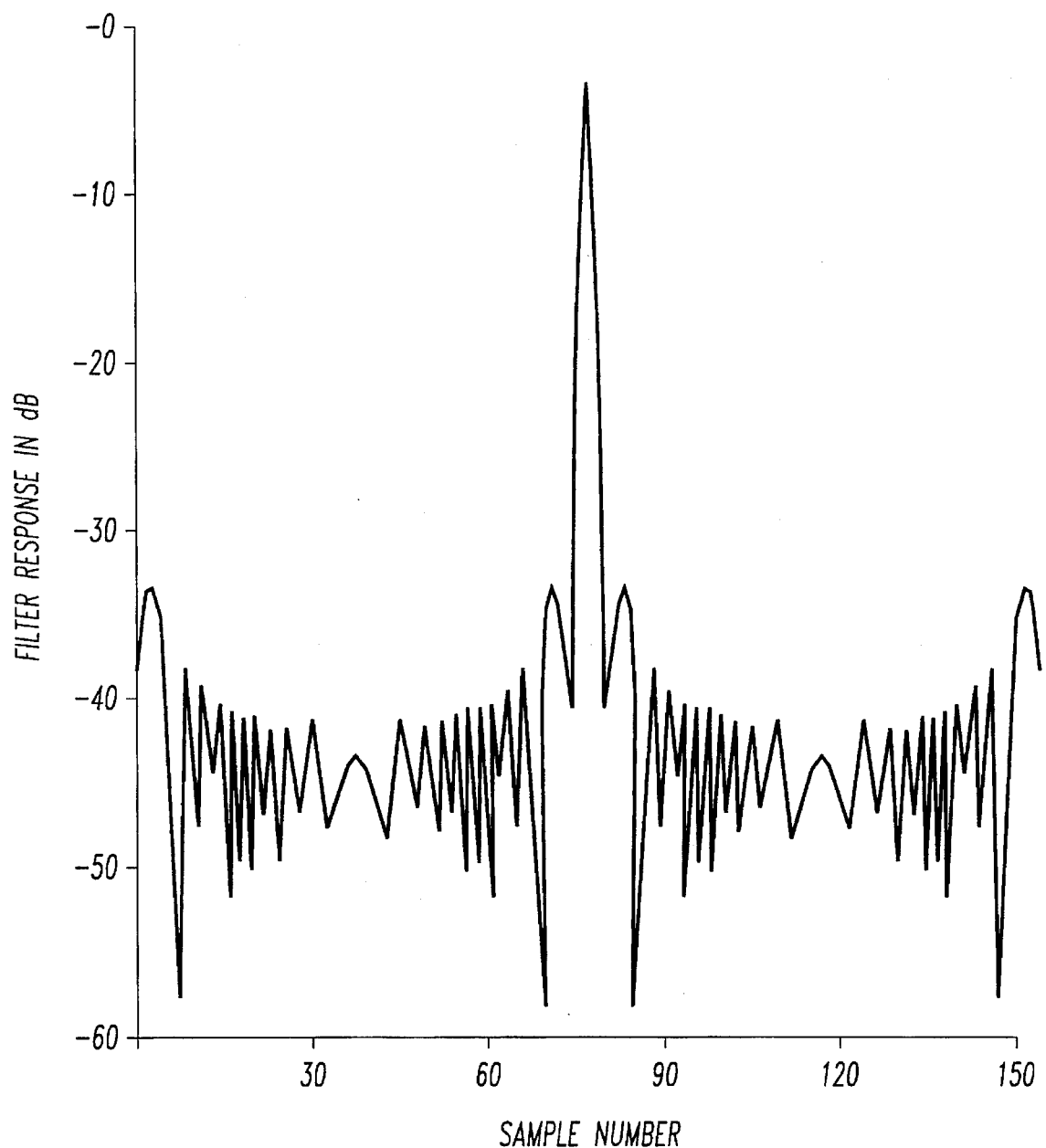
FIG. 6 illustrates the response of the prior art pulse compressor of FIG. 2 with sidelobe weighting.
Figure 12:
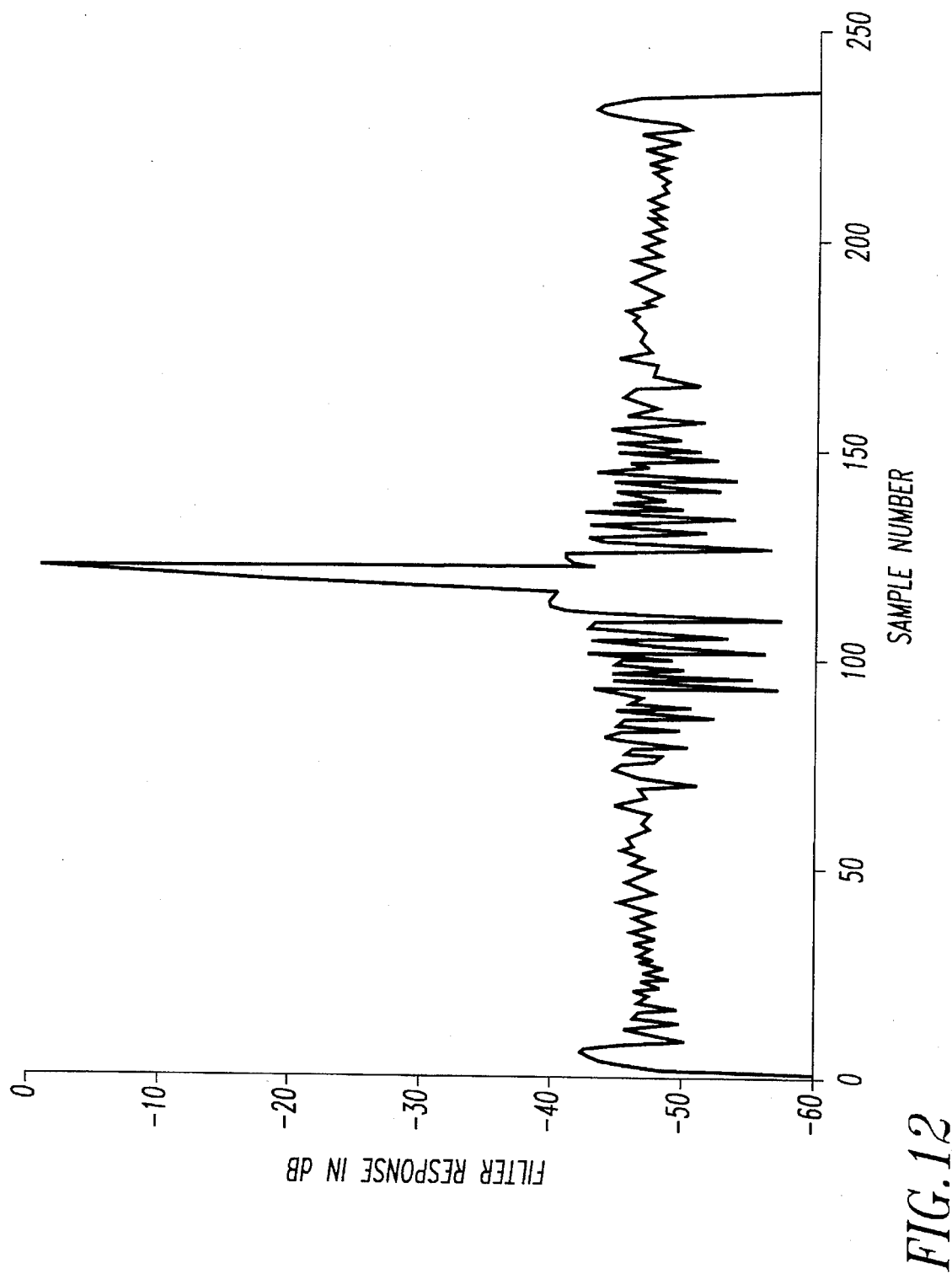
FIG. 12 illustrates the response of the pulse compressor of the present invention without sampling error.

FIG. 12 illustrates the response of a pulse compressor according to the present invention without sampling error. As shown in FIG. 12, the response of the pulse compressor according to the present invention achieves a very narrow mainlobe with sidelobes 40 dB below the mainlobe (compare to FIG. 3 representing the response of the Kretschmer device without sampling error).

Figure 13:
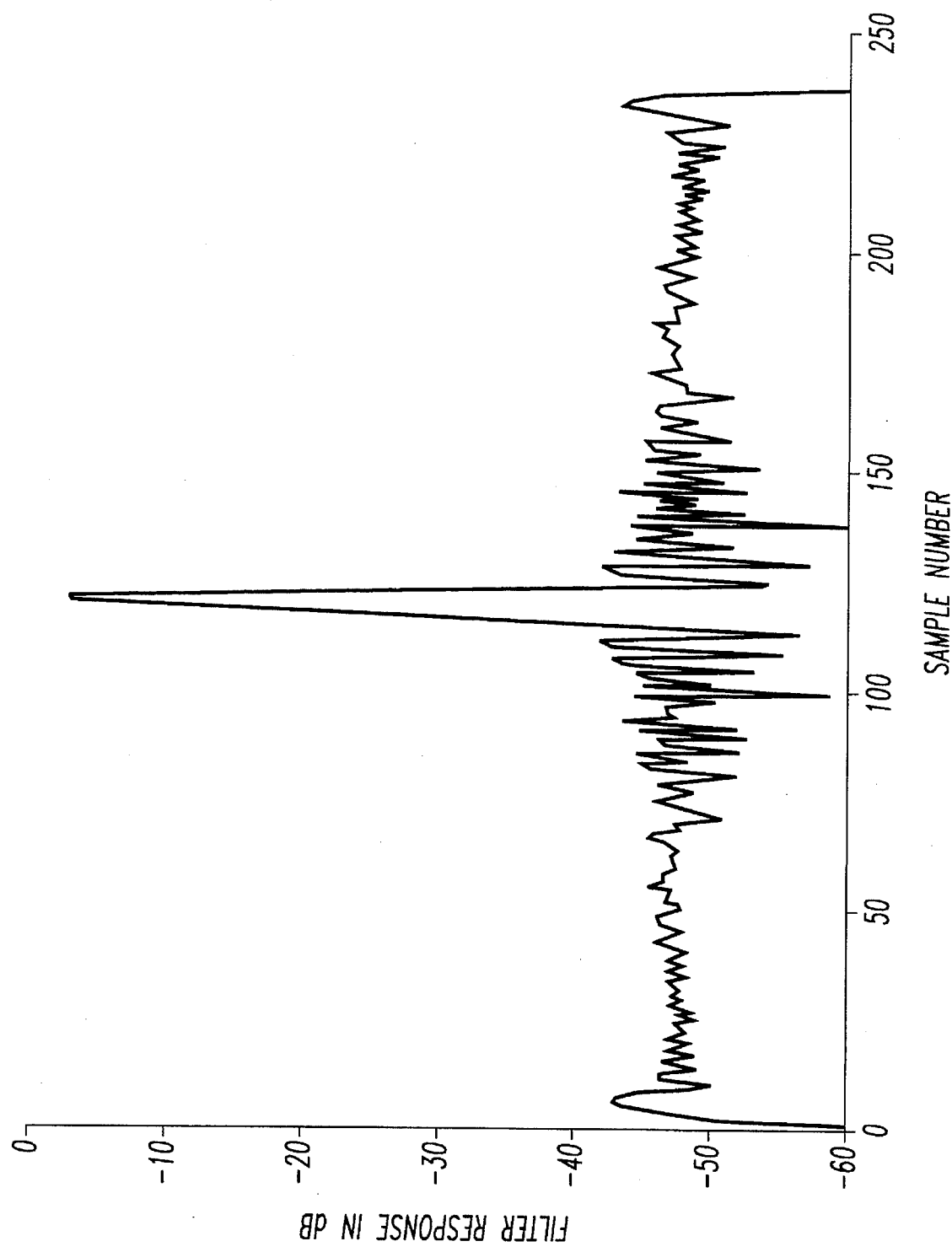
FIG. 13 illustrates the response of the pulse compressor of the present invention with sampling error.

Additionally the pulse compressor of the present invention does not significantly degrade when sampling error exists. FIG. 13 illustrates the response of the pulse compressor according to the present invention when a sampling error of ½ the sampling period exist. A comparison of FIGS. 12 and 13 demonstrates that the peak response of the pulse compressor according to the present invention degrades by only 1.6 dB, and the width of the mainlobe is unaffected. Accordingly, target resolution does not degrade with the present invention. With this approach, the range sampling loss is only 0.6 dB, compared to a loss of 1.5 dB for the Kretschmer device.

Figure 14:
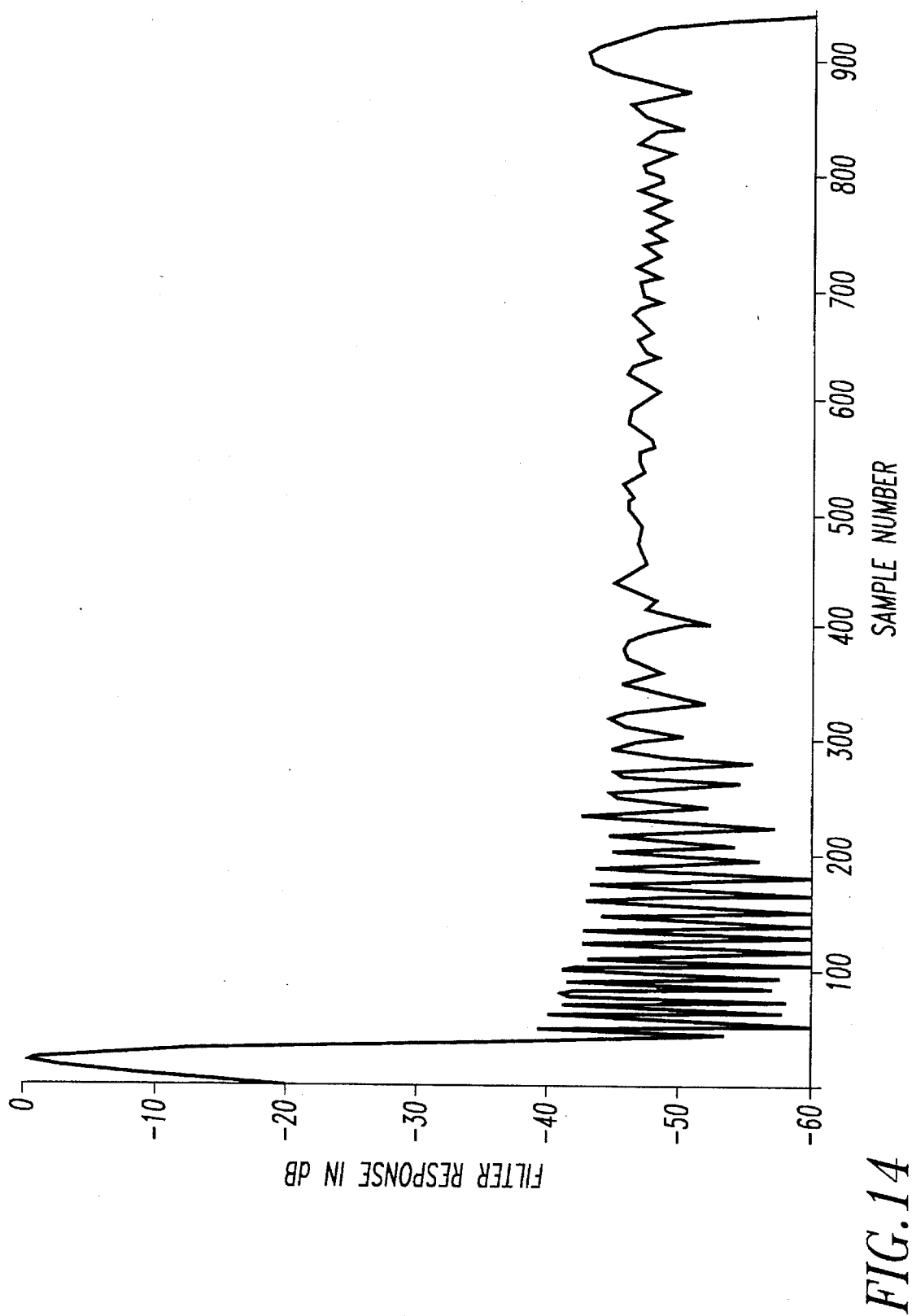
FIG. 14 illustrates the affects of over sampling on the pulse compressor of the present invention.

As an additional advantage, the pulse compressor of the present invention is not dependent upon the choice of sampling rate. FIG. 14 illustrates the response of the pulse compressor according to the present invention with over sampling. As illustrated in FIG. 14, the sidelobes have not degraded with oversampling.

Figure 19:
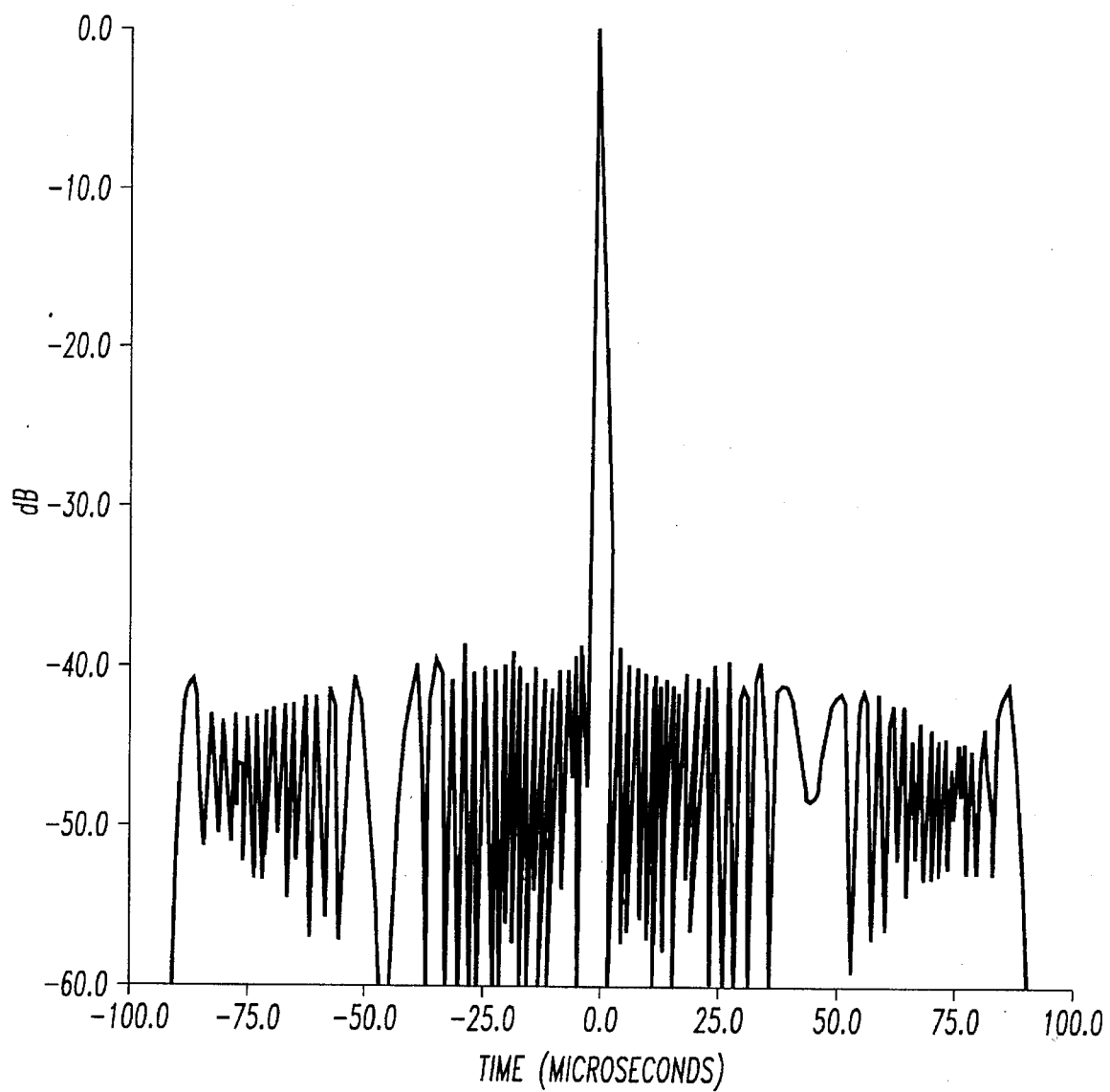
FIG. 19 illustrates the oversampled theoretical response of the pulse compressor according to the present invention.
Figure 20:
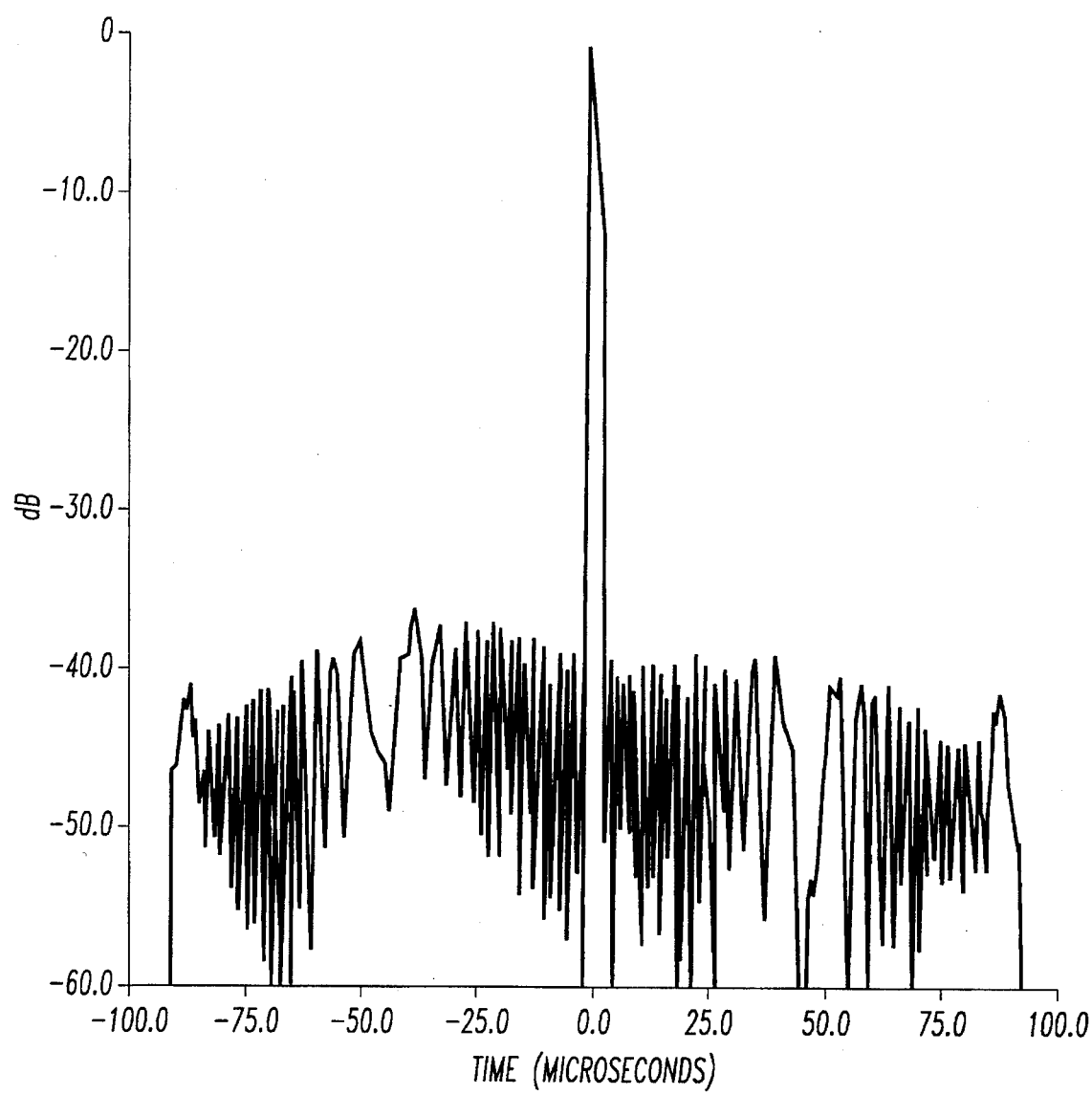
FIG. 20 illustrates the measured response of an actual radar system which employs the pulse compressor according to the present invention.

The pulse compressor of the present invention provides for improved sidelobe suppression and flexibility of the transmitted waveform. FIG. 12 illustrates the theoretical response of the pulse compressor of the present invention sampled at the 1.3 MHz rate. As FIG. 12 indicates, the peak response of the pulse compressor according to the present invention is around −0.9 dB representing a 0.9 dB mismatch loss. The 0.9 dB mismatch loss is low enough to be acceptable for practical applications. FIG. 19 illustrates the oversample theoretical response of the pulse compressor of the present invention. FIG. 20 illustrates the measured response of an actual radar system which employs the pulse compressor of the present invention. The measured response consists of digital data recorded at the output of the pulse compressor hardware after RF test targets were injected into the radar front end. The test targets were offset at fractions of the A/D sampling interval and the resulting data interleaved in time to produce the measured response which corresponds to the oversampled theoretical response. The agreement between FIGS. 19 and 20 demonstrates the practicality of the present invention.

As the discussion above indicates, the pulse compressor of the present invention allows the use of a non-linear FM waveform as the transmitted pulse. The above figures, FIGS. 12–15 were generated using a non-linear FM waveform as the transmitted pulse. Additionally, the present invention is also applicable to a linear FM transmitted pulse, since it is a special case of the more general non-linear FM waveforms.

The pulse compressor of the present invention is designed in accordance with the pulse to be transmitted, and therefore allows for increased flexibility with respect to the transmitted pulse. The pulse compressor of the present invention may be used with systems where a non-linear FM waveform is more preferable, and also in systems where a linear FM waveform is more preferable.

Figure 7:
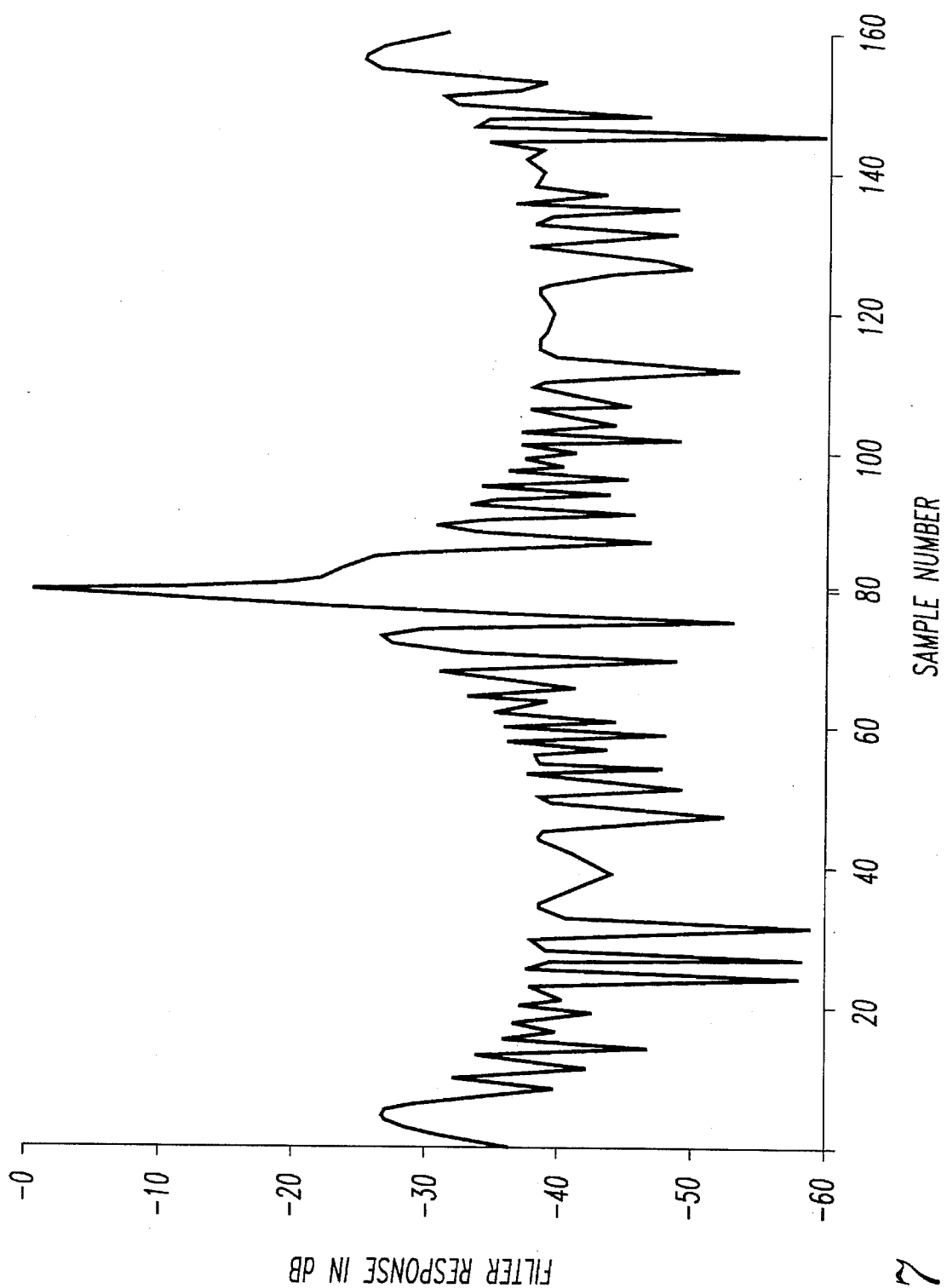
FIG. 7 illustrates the response of the prior art pulse compressor of FIG. 2 with Doppler.
Figure 15:
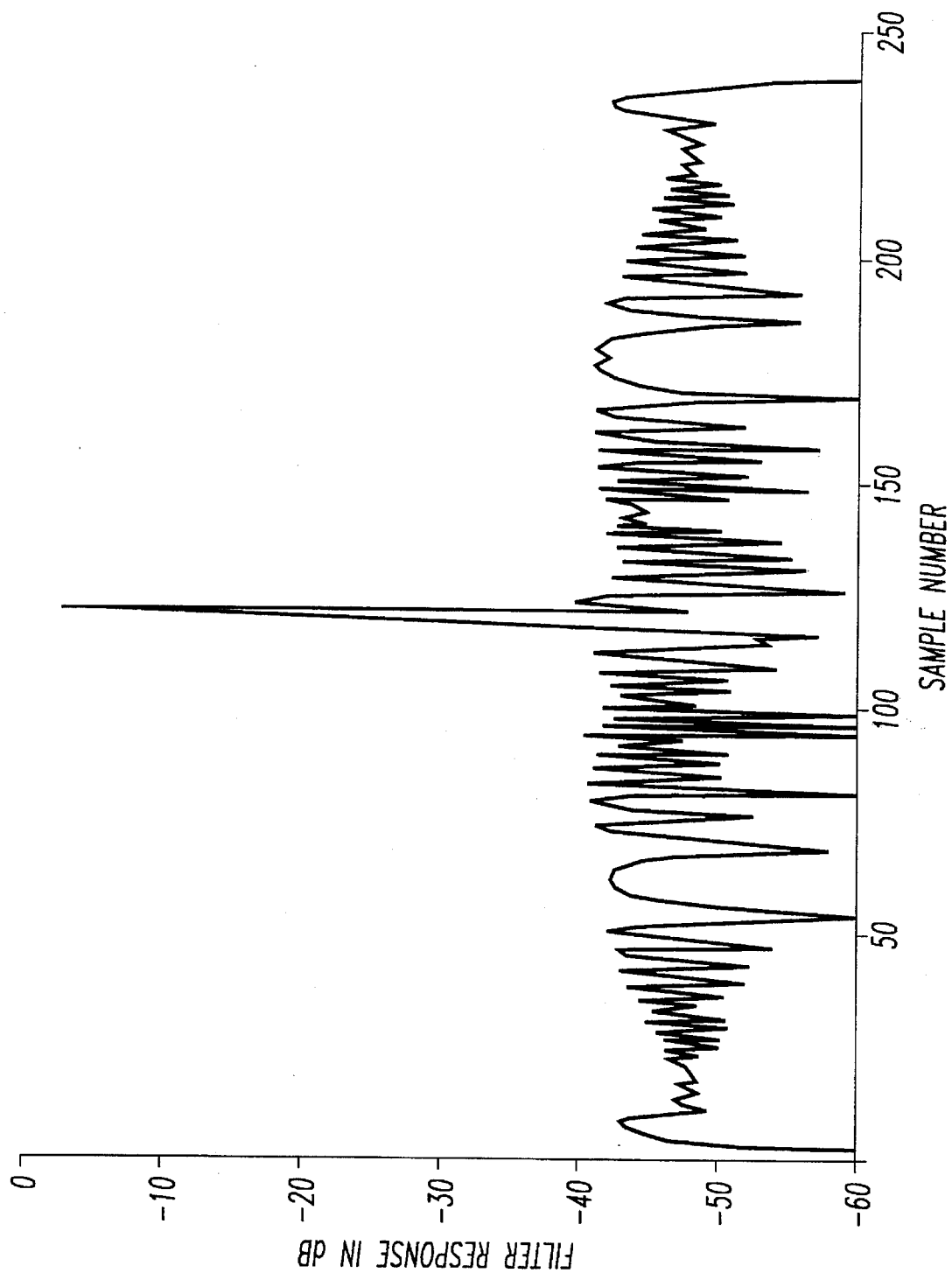
FIG. 15 illustrates the response of the pulse compressor of the present invention with Doppler.

The pulse compressor according to the present invention also improves Doppler tolerance. FIG. 15 illustrates the response of the pulse compressor according to the present invention with Doppler. The Doppler chosen is the same as that for FIG. 7 of the Kretschmer device, and represents a high speed target at L-band. As FIG. 15 indicates, the peak response of the pulse compressor according to the present invention is only reduced by 0.4 dB and the mainlobe is unaffected, whereas the mainlobe is significantly broadened in the Kretschmer device.

The outstanding advantage of the invention over the prior art is that it achieves low range sidelobes while requiring a sampling rate no greater than the frequency sweep of the transmitted pulse, which is the key to cost minimization of the analog-to-digital convertor, the digital pulse compressor, and all subsequent signal processing. This is made possible by the use of an intermediate-frequency filter with a 6 dB bandwidth which is less than the extent of the frequency sweep applied to the non-linear or linear FM waveform.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

We claim:

1. A hybrid analog-digital pulse compressor, comprising:
   an analog intermediate frequency filter receiving echo signals of a transmitted pulse and having a passband less than a frequency sweep of said transmitted pulse, said analog intermediate frequency filter filtering and weighting said echo signals, and said transmitted pulse being an FM signal;
   converting means for converting output of said analog intermediate frequency filter into digital baseband signals; and
   a digital correlator for digitally correlating said digital baseband signals to complete pulse compression of said echo signals.

2. The pulse compressor of claim 1, wherein, said analog intermediate frequency filter is a Bessel filter.

3. The pulse compressor of claim 1, wherein said digital correlator is a digital tapped delay line.

4. The pulse compressor of claim 3, wherein tap weights of taps in said tapped delay line are determined by taking the inverse fast Fourier transform of frequency response $H_D(\omega)$ for the digital correlator where $H_D(\omega)$ is determined according to the following expression:

$$H_D(\omega) = \frac{H_M(\omega)}{H_F(\omega)}$$

where $H_M(\omega)$ is a desired frequency response of said pulse compressor to achieve a specified sidelobe level and $H_F(\omega)$ is a frequency response of said analog intermediate frequency filter.

5. The pulse compressor of claim 3, wherein tap weights of taps in said tap delay line are determined based on a frequency response of said analog intermediate frequency filter.

6. The pulse compressor of claim 1, wherein said digital correlator comprises:
   a first FFT circuit taking a fast Fourier transform of said digital baseband signals;
   a second FFT circuit taking a fast Fourier transform of tap weights for said digital correlator;
   a multiplier multiplying output of said first FFT circuit and said second FFT circuit; and
   an inverse FFT circuit taking an inverse fast Fourier transform of output from said multiplier.

7. The pulse compressor of claim 6, wherein said tap weights are determined by taking the inverse fast Fourier transform of frequency response $H_D(\omega)$ for the digital correlator where $H_D(\omega)$ is determined according to the following expression:

$$H_D(\omega) = \frac{H_M(\omega)}{H_F(\omega)}$$

where $H_D(\omega)$ is a desired frequency response of said pulse compressor and $H_F(\omega)$ is a frequency response of said analog intermediate frequency filter.

8. The pulse compressor of claim 6, wherein said tap weights are determined based on a frequency response of said analog intermediate frequency filter.

9. The pulse compressor of claim 1, wherein said digital correlator performs digital correlation and pulse compression by weighting phase components of said digital baseband signals in accordance with phase weights determined based on the frequency response of said analog intermediate frequency filter.

10. The pulse compressor of claim 1, wherein said digital correlator has a frequency response set based on a frequency response of said analog intermediate frequency filter.

11. The pulse compressor of claim 1, wherein said transmitted pulse is a non-linear FM waveform.

12. The pulse compressor of claim 1, wherein said transmitted pulse is a non-linear FM pulse.

13. A method of pulse compression, comprising:
   a) receiving echo signals of a transmitted pulse, said transmitted pulse being an FM signal;
   b) filtering and weighting said echo signals with an analog intermediate frequency filter having a passband less than a frequency sweep of said transmitted pulse;
   c) converting output of said analog intermediate frequency filter into digital baseband signals; and
   d) digitally correlating said digital baseband signals with a digital correlator to complete pulse compression of said echo signals.

14. The method of claim 13, wherein said step a) performs said filtering using a Bessel filter as said analog intermediate frequency filter.

15. The method of claim 13, wherein said step d) performs said digital correlation using a tapped delay line.

16. The method of claim 15, wherein said step d) performs said digital correlation using tap weights of taps in said tapped delay line which are determined by taking the inverse fast Fourier transform of frequency response $H_D(\omega)$ for the digital correlator where $H_D(\omega)$ is determined according to the following expression:

$$H_D(\omega) = \frac{H_M(\omega)}{H_F(\omega)}$$

where $H_M(\omega)$ is a desired frequency response of said pulse compressor and $H_F(\omega)$ is a frequency response of said analog intermediate frequency filter.

17. The method of claim 15, wherein said step d) performs said digital correlation using tap weights of taps in said tap delay line which are determined based on a frequency response of said analog intermediate frequency filter.

18. The method of claim 13, wherein said step d) comprises the following steps:
   d1) taking a fast Fourier transform of said digital baseband signals;
   d2) taking a fast Fourier transform of tap weights of the digital correlator;
   d3) multiplying output of said step d1) and said step d2); and
   d4) taking an inverse fast Fourier transform of output from said step d3).

19. The method of claim 18, wherein said step d2) fast Fourier transforms said tap weights which are determined by taking the inverse fast Fourier transform of frequency response $H_D(\omega)$ for the digital correlator where $H_D(\omega)$ is determined according to the following expression:

$$H_D(\omega) = \frac{H_M(\omega)}{H_F(\omega)}$$

where $H_D(\omega)$ is a desired frequency response of said pulse compressor and $H_F(\omega)$ is a frequency response of said analog intermediate frequency filter.

20. The method of claim 18, wherein said step d2) fast Fourier transforms said tap weights which are determined based on a frequency response of said analog intermediate frequency filter.

21. The method of claim 13, wherein said step d) performs digital correlation and pulse compression by weighting a phase of components of said digital baseband signals in accordance with phase weights determined based on a frequency response of said analog intermediate frequency filter.

22. The method of claim 13, wherein said step d) performs digital correlation using a digital correlator having a frequency response set based on a frequency response of said analog intermediate frequency filter.

23. The method of claim 13, wherein said transmitted pulse is a non-linear FM waveform.

24. The method of claim 13, wherein said transmitted pulse is a non-linear FM pulse.

25. A method of using a pulse compressor, comprising:
 a) providing an analog intermediate frequency filter with a passband less than a frequency sweep of a transmitted pulse, said transmitted pulse being an FM signal;
 b) providing a converting means which converts analog signals into digital baseband signals;
 c) providing a digital correlator which digitally correlates baseband data signals;
 d) receiving echo signals of said transmitted pulse with said analog intermediate frequency filter;
 e) filtering and weighting said echo signals with said analog intermediate frequency filter;
 f) converting output of said step e) with said converting means to form digital baseband data signals; and
 g) digitally correlating output of said step (f) using said digital correlator.

26. The method of claim 25, wherein said step a) provides Bessel filter as said analog intermediate frequency filter.

27. The method of claim 25, wherein said step c) provides a tapped delay line as said digital correlator.

28. The method of claim 25, wherein said step c) comprises the steps of:
 c1) providing a first FFT circuit for taking a fast Fourier transform of said digital baseband signals;
 c2) providing a second FFT circuit for taking a fast Fourier transformer of tap weights of said digital correlator
 c3) providing a multiplier for multiplying output of said first FFT circuit and said second FFT circuit; and
 c4) providing an inverse FFT circuit for taking an inverse fast Fourier transform of output from said multiplier.

29. The method of claim 25, wherein said step c) provides said digital correlator having a frequency response set based on a frequency response of said analog intermediate frequency filter.

30. A method of manufacturing a pulse compressor, comprising:
 a) determining a time function of a transmitted pulse, said transmitted pulse being an FM signal;
 b) determining a desired frequency response of a pulse compressor based on said time function of said transmitted pulse;
 c) selecting an analog intermediate frequency filter with a passband less than a frequency sweep of said transmitted pulse;
 d) determining a frequency response of said selected analog intermediate frequency filter;
 e) providing a converting means which converts analog signals to digital baseband signals;
 f) connecting an input of said converting means to an output of said selected analog intermediate frequency filter;
 g) selecting a digital correlator which digitally correlates and compresses digital baseband data signals and has a frequency response substantially equal to said desired frequency response of said pulse compressor divided by said frequency response of said selected analog intermediate frequency filter; and
 h) connecting an output of said converting means to an input of said digital correlator.

31. The method of claim 28, wherein said step c) selects an analog intermediate frequency filter which provides rapid falloff in both frequency and time domains.

32. The method of claim 28, wherein said step g) selects a digital correlator which is a tapped delay line.

33. The method of claim 30, wherein said step g) selects a digital correlator which comprises:
 a first FFT circuit taking a fast Fourier transform of said digital baseband signals;
 a second FFT circuit taking a fast Fourier transform of tap weights of said digital correlator;
 a multiplier multiplying output of said first FFT circuit and said second FFT circuit; and
 an inverse FFT circuit taking an inverse fast Fourier transform of output from said multiplier.

* * * * *